(12) United States Patent
Ishihara et al.

(10) Patent No.: US 9,135,869 B2
(45) Date of Patent: Sep. 15, 2015

(54) DISPLAY SIGNAL GENERATOR, DISPLAY DEVICE, AND METHOD OF IMAGE DISPLAY

(75) Inventors: Tomoyuki Ishihara, Osaka (JP); Masaaki Moriya, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 350 days.

(21) Appl. No.: 13/704,048

(22) PCT Filed: Mar. 24, 2011

(86) PCT No.: PCT/JP2011/057109
§ 371 (c)(1),
(2), (4) Date: Dec. 13, 2012

(87) PCT Pub. No.: WO2011/158541
PCT Pub. Date: Dec. 22, 2011

(65) Prior Publication Data
US 2013/0120478 A1      May 16, 2013

(30) Foreign Application Priority Data

Jun. 15, 2010   (JP) ................................. 2010-136426

(51) Int. Cl.
| G09G 3/36 | (2006.01) |
| G09G 3/20 | (2006.01) |
| G02F 1/1335 | (2006.01) |

(52) U.S. Cl.
CPC ............ *G09G 3/3607* (2013.01); *G09G 3/2022* (2013.01); *G02F 1/133603* (2013.01); *G02F 2001/133601* (2013.01); *G02F 2001/133622* (2013.01); *G09G 3/3648* (2013.01)

(58) Field of Classification Search
CPC ................ G09G 3/2022–3/204; G09G 3/3607
See application file for complete search history.

(56) References Cited

U.S. PATENT DOCUMENTS

| 6,492,969 | B1 | 12/2002 | Budzelaar |
| 2007/0236444 | A1 | 10/2007 | Woo et al. |

FOREIGN PATENT DOCUMENTS

| JP | 2000193937 A | 7/2000 |
| JP | 2001-272956 A | 10/2001 |
| JP | 2007279660 A | 10/2007 |
| JP | 2009080239 A | 4/2009 |
| JP | 2009287733 A | 12/2009 |
| JP | 2010113072 A | 5/2010 |

OTHER PUBLICATIONS

Machine translation of JP 2001-272956 A.*
International Search Report for International Application No. PCT/JP2011/057109 dated Apr. 12, 2011.

* cited by examiner

*Primary Examiner* — Michael Pervan
(74) *Attorney, Agent, or Firm* — Harness, Dickey & Pierce, P.L.C.

(57) ABSTRACT

In a display signal generator for use in a display device, in order to display the image corresponding to the input image signals, a combination of desired display time aperture ratios are obtained for each pixel in N number of sub-frame phases, a combination of display time aperture ratios in the N number of sub-frame phases at the time the display color is actually reproduced is set from the combination of the desired time aperture ratios on the basis of response characteristics of a pixel array unit, and a modulation signal which implements the combination of display time aperture ratios that were set is output.

19 Claims, 15 Drawing Sheets

Display time aperture ratio

Light source emission ratio

Integrated brightness ratio

| Desired time aperture ratio of first sub-frame phase | Desired time aperture ratio of second sub-frame phase | Desired time aperture ratio of third sub-frame phase | Modulation signal of first sub-frame phase | Modulation signal of second sub-frame phase | Modulation signal of third sub-frame phase |
|---|---|---|---|---|---|
| 0 | 0 | 0 | 0 | 0 | 0 |
| 0 | 0 | 1 | 0 | 0 | 3 |
| ... | ... | ... | ... | ... | ... |
| 100 | 100 | 100 | 100 | 100 | 100 |

FIG. 5

Display time aperture ratio

Light source emission ratio

Integrated brightness ratio

FIG. 13A  Display time aperture ratio 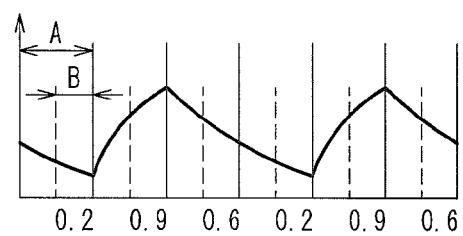
FIG. 13B  Red light source emission ratio 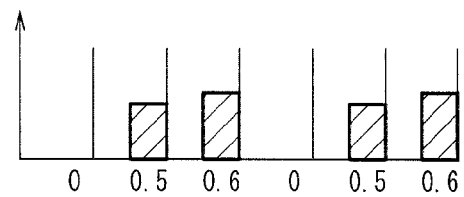
FIG. 13C  Green light source emission ratio 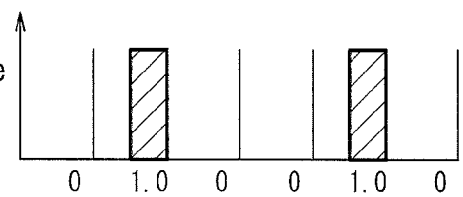
FIG. 13D  Blue light source emission ratio 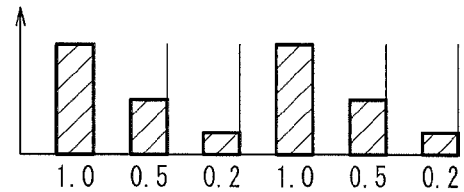
FIG. 13E  Red integrated brightness ratio 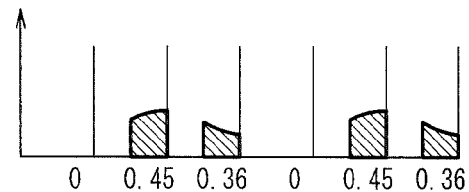
FIG. 13F  Green integrated brightness ratio 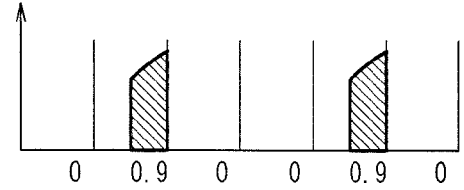
FIG. 13G  Blue integrated brightness ratio 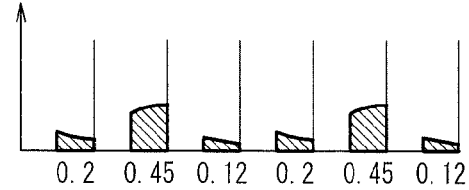

| 1-1 (1) | 1-2 (2) | 1-3 (3) | 1-4 (4) | 1-5 (5) | 1-6 (6) | 1-7 (7) | 1-8 (8) | 1-9 (9) | 1-10 (10) |
|---|---|---|---|---|---|---|---|---|---|
| 2-1 (11) | 2-2 (12) | 2-3 (13) | 2-4 (14) | 2-5 (15) | 2-6 (16) | 2-7 (17) | 2-8 (18) | 2-9 (19) | 2-10 (20) |
| 3-1 (21) | 3-2 (22) | 3-3 (23) | 3-4 (24) | 3-5 (25) | 3-6 (26) | 3-7 (27) | 3-8 (28) | 3-9 (29) | 3-10 (30) |
| 4-1 (31) | 4-2 (32) | 4-3 (33) | 4-4 (34) | 4-5 (35) | 4-6 (36) | 4-7 (37) | 4-8 (38) | 4-9 (39) | 4-10 (40) |
| 5-1 (41) | 5-2 (42) | 5-3 (43) | 5-4 (44) | 5-5 (45) | 5-6 (46) | 5-7 (47) | 5-8 (48) | 5-9 (49) | 5-10 (50) |
| 6-1 (51) | 6-2 (52) | 6-3 (53) | 6-4 (54) | 6-5 (55) | 6-6 (56) | 6-7 (57) | 6-8 (58) | 6-9 (59) | 6-10 (60) |
| 7-1 (61) | 7-2 (62) | 7-3 (63) | 7-4 (64) | 7-5 (65) | 7-6 (66) | 7-7 (67) | 7-8 (68) | 7-9 (69) | 7-10 (70) |
| 8-1 (71) | 8-2 (72) | 8-3 (73) | 8-4 (74) | 8-5 (75) | 8-6 (76) | 8-7 (77) | 8-8 (78) | 8-9 (79) | 8-10 (80) |
| 9-1 (81) | 9-2 (82) | 9-3 (83) | 9-4 (84) | 9-5 (85) | 9-6 (86) | 9-7 (87) | 9-8 (88) | 9-9 (89) | 9-10 (90) |
| 10-1 (91) | 10-2 (92) | 10-3 (93) | 10-4 (94) | 10-5 (95) | 10-6 (96) | 10-7 (97) | 10-8 (98) | 10-9 (99) | 10-10 (100) |

FIG. 15

DISPLAY SIGNAL GENERATOR, DISPLAY DEVICE, AND METHOD OF IMAGE DISPLAY

TECHNICAL FIELD

The present invention relates to a display signal generator that generates display signals for performing image display, a display device that uses the same, and a method of image display.

BACKGROUND ART

Recently, liquid crystal displays, for example, are widely used in liquid crystal televisions, monitors, portable telephones and the like as flat panel displays that are thinner and lighter than conventional cathode ray tube devices. Such liquid crystal display devices have a lighting device (backlight) that emits light, and a liquid crystal panel, which has a plurality of pixels, that displays desired images by acting as a shutter of light emitted from a light source provided in the lighting device. A display signal generator is used in this type of liquid crystal display device to generate display signals for performing image display using input image signals for reference, and to output the display signals as instruction signals for the lighting device (light source) and the liquid crystal panel (pixel array unit). As a result, the input images corresponding to the input image signals are displayed on the liquid crystal display device.

The abovementioned liquid crystal display device includes a drive system that divides one frame into three sub-frame phases by using light-emitting diodes (LED) of the three colors of red (R), green (G) and blue (B) as light sources and sequentially flashing LEDs of the three colors, displays red only images, green only images, and blue only images in order in three continuous sub-frame phases, and reproduces the display colors of the input images in each pixel by superposing the sub-frame phases in the temporal direction in a liquid crystal panel not provided with a color filter. This drive system, which is also called a field sequential drive system, is known in the related art.

There is a problem in the liquid crystal display device of the field sequential system in that, since the response speed of liquid crystal is slow, an accurate display intensity in the sub-frame phase for each color cannot be achieved and the display color of the image represented by superposing the sub-frame phases is quite different from the input image.

To solve this problem, a method has been proposed, as disclosed in for example the below mentioned patent document 1, to refer to the immediately preceding color sub-frame phase signals to correct the subsequent color sub-frame phase signals. Specifically, in the conventional display signal generator and image display method, in each of the abovementioned sub-frame phases, the response inadequacy of the liquid crystal panel is compensated by generating and outputting an instruction signal to the liquid crystal panel so that a voltage that corresponds to an emphasized gradation signal and that is larger or smaller than a pixel gradation signal corresponding to the input image signal is supplied to the pixel, and a reduction in pixel color purity caused by the response characteristics is compensated to allow for improved image quality in the liquid crystal display device.

PRIOR ART DOCUMENTS

Patent Document

Patent Document 1: U.S. Pat. No. 6,492,969

DISCLOSURE OF INVENTION

Problem to be Solved by the Invention

However, in the abovementioned conventional display signal generator and image display method, there is a problem in that time integrated brightness of each color sub-frame phase attributed to the display image that is a superposition of the color sub-frame phases cannot be controlled accurately and the image that the input signal assumes cannot be properly reproduced thus reducing image quality.

In consideration of the above problem, an object of the present invention is to provide a display signal generator that can improve image quality when performing color display using a light source and a pixel array unit, which is not provided with a color filter, having slow response speed, a display device that uses the display signal generator, and a method of image display.

Means for Solving Problem

In order to achieve the above object, a display signal generator according to the present invention includes a pixel array unit of a plurality of aligned pixels and a plurality of light sources of different color components, that is configured to be able to adjust display brightness by modulating light from the light sources, and that reproduces a display color of an input image in each pixel by superposition of N number (where N is an integer of two or more) of sub-frame phases in the time direction; wherein in order to display an input image corresponding to an input image signal, a combination of desired time aperture ratios is obtained for each pixel in the N number of sub-frame phases, a combination of display time aperture ratios in the N number of sub-frame phases at the time the display color is actually reproduced is set from the combination of desired time aperture ratios on the basis of response characteristics of the pixel array unit, and a modulation signal for implementing the set combination of display time aperture ratios is output to the display unit.

In the display signal generator configured as described above, a combination of desired time aperture ratios is obtained for each pixel in the N number of sub-frame phases in order to display an input image corresponding to an input image signal. Additionally, the above combination of display time aperture ratios in the N number of sub-frame phases is set from the combination of the desired time aperture ratios on the basis of response characteristics of the pixel array unit, and a modulation signal for implementing the set combination of display time aperture ratios is output to a display device. As a result, unlike the above prior art, color variation of the display image caused by inadequate response speed of the pixel array unit can be minimized and an image assumed by the input signal can be reproduced accurately.

Moreover, in the above display signal generator, a modulation signal for implementing the combination of the display time aperture ratios may be output to cause hue of a display color displayed by superposition of the N number of sub-frame phases in the time direction to approximate the hue of the input image corresponding to the input image signal.

In this case, color variation of the display image caused by inadequate response speed of the pixel array unit can be minimized and an image assumed by the input signal can be reproduced accurately due to the hue of the actually displayed display color approximating the hue of the above input image.

Moreover, in the above display signal generator, a modulation signal for implementing the combination of the display time aperture ratios may be output to cause a difference between the smallest primary color component and the second smallest primary color component when a display color displayed by the superposition of the N number of sub-frame phases in the time direction is represented with the three primary colors of red, green, and blue, to approximate a difference between the smallest primary color component and the second smallest primary color component when the input image corresponding to the input image signal is represented with the three primary colors of red, green, and blue.

In this case, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the above display signal generator, a modulation signal for implementing the combination of the display time aperture ratios may be output to cause a difference between the largest primary color component and the second largest primary color component when a display color displayed by the superposition of N number of sub-frame phases in the time direction is represented with the three primary colors of red, green, and blue, to approximate a difference between the smallest primary color component and the second smallest primary color component when the input image corresponding to the input image signal is represented with the three primary colors of red, green, and blue.

In this case, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the above display signal generator, three or more sub-frame phase may be used as the N number of sub-frame phases, and when there is one sub-frame phase of a desired time aperture ratio that is larger than an average of the desired time aperture ratios in the three or more sub-frame phases, a modulation signal is output to cause a difference of the display time aperture ratios between the respective sub-frame phases from the second largest desired time aperture ratio sub-frame phase to the smallest desired time aperture ratio sub-frame phase to approximate a difference of desired time aperture ratios between the corresponding sub-frame phases from the second largest desired time aperture ratio sub-frame phase to the smallest desired time aperture ratio sub-frame phase.

In this case, when there is a sub-frame phase having a desired time aperture ratio larger than an average of the desired time aperture ratios in the three or more sub-frame phases, the corresponding display time aperture ratios can be appropriately set on the basis of the desired time aperture ratios of the respective remaining sub-frame phases. As a result, color variation of the display image caused by inadequate response speed of the pixel array unit can be minimized and an image assumed by the input signal can be reproduced accurately by the display color of the display image actually displayed being able to further approximate the input image corresponding to the input image signal.

Moreover, in the above display signal generator, three or more sub-frame phase may be used as the N number of sub-frame phases, and when there is one sub-frame phase of a desired time aperture ratio that is larger than an average of the desired time aperture ratios in the three or more sub-frame phases, a modulation signal is output to cause a difference of display time aperture ratios between the largest desired time aperture ratio sub-frame phase and the second largest desired time aperture ratio sub-frame phase to approximate a difference of desired time aperture ratios between the largest desired time aperture ratio sub-frame phase and the second largest desired time aperture ratio sub-frame phase.

In this case, when there is one sub-frame phase having a desired time aperture ratio larger than an average of the desired time aperture ratios in the three or more sub-frame phases, the corresponding display time aperture ratios can be appropriately set on the basis of the largest desired time aperture ratio and the second largest desired time aperture ratio. As a result, color variation of the display image caused by inadequate response speed of the pixel array unit can be minimized and an image assumed by the input signal can be reproduced accurately by the display color of the display image actually displayed being able to further approximate the input image corresponding to the input image signal.

Moreover, in the above display signal generator, three or more sub-frame phase may be used as the N number of sub-frame phases, and when there is one sub-frame phase of a desired time aperture ratio that is smaller than an average of desired time aperture ratios in the three or more sub-frame phases, a modulation signal is output to cause a difference of display time aperture ratios between the respective sub-frame phases from the second smallest desired time aperture ratio sub-frame phase to the largest desired time aperture ratio sub-frame phase to approximate a difference of desired time aperture ratios between the corresponding sub-frame phases from the second smallest desired time aperture ratio sub-frame phase to the largest desired time aperture ratio sub-frame phase.

In this case, when there is one sub-frame phase having a desired time aperture ratio smaller than an average of the desired time aperture ratios in the three or more sub-frame phases, the corresponding display time aperture ratios can be appropriately set on the basis of the desired time aperture ratios of the respective remaining sub-frame phases. As a result, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the above display signal generator, three or more sub-frame phase may be used as the N number of sub-frame phases, and when there is one sub-frame phase of a desired time aperture ratio that is smaller than an average of desired time aperture ratios in the three or more sub-frame phases, a modulation signal is output to cause a difference of the display time aperture ratios between the smallest desired time aperture ratio sub-frame phase and the second smallest desired time aperture ratio sub-frame phase to approximate a difference of desired time aperture ratios between the smallest desired time aperture ratio sub-frame phase and the second smallest desired time aperture ratio sub-frame phase.

In this case, when there is one sub-frame phase having a desired time aperture ratio smaller than an average of the desired time aperture ratios in the three or more sub-frame phases, the corresponding display time aperture ratios can be appropriately set on the basis of the smallest desired time aperture ratio and the second smallest desired time aperture ratio. As a result, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the above display signal generator according to the present invention, three or more sub-frame phase may be used as the N number of sub-frame phases, and, when desired time aperture ratios in three continuous sub-frame phases among the three or more sub-frame phases are respectively represented as A1, A2, and A3, and modulation signals in the three continuous sub-frame phases are respectively represented as S1, S2, and S3, and the following inequality (1) is satisfied with respect to thresholds T1, T2 prescribed by the response characteristics of the pixel array unit:

$$A1 \geq T2 > T1 \geq A2 \geq A3 \quad (1)$$

the modulation signals satisfy the following inequality (2):

$$S2 < S3 \quad (2).$$

In this case, when the desired time aperture ratios A1, A2, and A3 of the three continuous sub-frame phases satisfy the inequality (1) including the above thresholds T1, T2, the modulation signals S2, S3 may be appropriately determined in consideration of the response characteristics of the pixel array unit. As a result, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the display signal generator according to the present invention, three or more sub-frame phase may be used as the N number of sub-frame phases, and, when desired time aperture ratios in three continuous sub-frame phases among the three or more sub-frame phases are respectively represented as A4, A5, and A6, and modulation signals in the three continuous sub-frame phases are respectively represented as S4, S5, and S6, and the following inequality (3) is satisfied with respect to thresholds T3, T4 prescribed by the response characteristics of the pixel array unit:

$$A4 \leq T3 < T4 \leq A5 \leq A6 \quad (3)$$

the modulation signals satisfy the following inequality (4):

$$S5 > S6 \quad (4).$$

In this case, when the desired time aperture ratios A4, A5, and A6 of the three continuous sub-frame phases satisfy the inequality (3) including the above thresholds T3, T4, the modulation signals S5, S6 may be appropriately determined in consideration of the response characteristics of the pixel array unit. As a result, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the display signal generator of the present invention, lighting intensities of the light sources are preferably adjusted on the basis of the input image signal and light source control signals are preferably output to the display device.

In this case, since lighting of the light sources is driven on the basis of the input image signal, the power consumption of the display device can be reduced.

Moreover, in the display signal generator of the present invention, the light source control signals may be a plurality of pulsed signals that cause the light sources to perform a plurality of lighting operations during one sub-frame phase.

In this case, the occurrence of color shift due to the magnitude of the emission intensities can be suppressed by driving the lighting of the light sources using the plurality of pulsed signals even when using a light source device in which the emission spectra changes due to the magnitude of the electric current amount.

Moreover, in the display signal generator of the present invention, light emission periods and light extinction periods in the plurality of lighting operations in the one sub-frame phase may each be equalized or made to approach equality.

In this case, the occurrence of color shift due to the magnitude of the emission intensities can be reliably suppressed even when using the above light source device.

Moreover, in the above display signal generator, light source control signals may be output to the display device for causing light sources of two or more colors to be lit among the plurality of light sources in at least one sub-frame phase among the N number of sub-frame phases.

In this case, an effect of concentrating display brightness in a specific sub-frame phase can be obtained, so that the occurrence of color breaking can be prevented or suppressed.

Moreover, in the above display signal generator, light source control signals for independently controlling a lighting intensity of each light source or each set of a plurality of light sources may be output to a light source array unit composed of a plurality of light sources so that amounts of light reaching each pixel from each light source are different.

In this case, since the lighting of each light source or each set of the plurality of light sources is driven, the power consumption of the display device can be easily reduced.

Moreover, the display device of the present invention uses any of the above-described display signal generators.

In the display device configured as described above, a display device that can be easily configured to accurately reproduce an image assumed by an input signal even when color display is performed using a light source and a pixel array unit, which is not provided with a color filter, having slow response speed since a display signal generator is used that can improve display quality when performing color display using the light source and the pixel array unit, which is not provided with a color filter, having slow response speed.

Moreover, a method of an image display according to the present invention is an image display method for a display device that includes a pixel array unit of a plurality of aligned pixels and a plurality of light sources of different color components, that is configured to be able to adjust display brightness by modulating light from the light sources, and that reproduces a display color of an input image in each pixel by superposition of N number (where N is an integer of two or more) of sub-frame phases in the time direction, the method preferably comprising:

obtaining a combination of desired time aperture ratios for each pixel in the N number of sub-frame phases in order in order to display an input image corresponding to an input image signal;

setting a combination of display time aperture ratios in the N number of sub-frame phases when actually reproducing the display color, from the desired time aperture ratios in response to response characteristics of the pixel array unit; and outputting a modulation signal for implementing the set combination of display time aperture ratios.

In the image display method configured as described above, a combination of desired time aperture ratios is obtained for each pixel in the N number of sub-frame phases in order to display an input image corresponding to an input image signal. Additionally, the above combination of display time aperture ratios in the N number of sub-frame phases is set from the combination of the desired time aperture ratios on the basis of response characteristics of the pixel array unit, and a modulation signal for implementing the set combination of display time aperture ratios is output. As a result, unlike the above prior art, color variation of the display image caused by inadequate response speed of the pixel array unit can be minimized and an image assumed by the input signal can be reproduced accurately.

Moreover, in the above image display method, a modulation signal for implementing the combination of the display time aperture ratios may be output to cause hue of a display color displayed by the superposition of the N number of sub-frame phases in the time direction to approximate the hue of the input image corresponding to the input image signal.

In this case, color variation of the display image caused by the inadequate response speed of the pixel array unit can be minimized and an image assumed by the input signal can be reproduced accurately due to the hue of the actually displayed display color approximating the hue of the above input image.

Moreover, in the above image display method, a modulation signal for implementing the combination of the display time aperture ratios may be output to cause a difference between the smallest primary color component and the second smallest primary color component when a display color displayed by the superposition of the N number of sub-frame phases in the time direction is represented with the three primary colors of red, green, and blue, to approximate a difference between the smallest primary color component and the second smallest primary color component when the input image corresponding to the input image signal is represented with the three primary colors of red, green, and blue.

In this case, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the above image display method, a modulation signal for implementing the combination of the display time aperture ratios may be output to cause a difference between the largest primary color component and the second largest primary color component when a display color displayed by the superposition of the N number of sub-frame phases in the time direction is represented with the three primary colors of red, green, and blue, to approximate a difference between the largest primary color component and the second largest primary color component when the input image corresponding to the input image signal is represented with the three primary colors of red, green, and blue.

In this case, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the above image display method, three or more sub-frame phases may be used as the N number of sub-frame phases, and when there is one sub-frame phase of a desired time aperture ratio larger than an average of the desired time aperture ratios in the three or more sub-frame phases, a modulation signal may be output to cause a difference of the display time aperture ratios between the respective sub-frame phases from the second largest desired time aperture ratio sub-frame phase to the smallest desired time aperture ratio sub-frame phase to approximate a difference of desired time aperture ratios between the corresponding sub-frame phases from the second largest desired time aperture ratio sub-frame phase to the smallest desired time aperture ratio sub-frame phase.

In this case, when there is one sub-frame phase having a desired time aperture ratio larger than an average of the desired time aperture ratios in the three or more sub-frame phases, the corresponding display time aperture ratios can be appropriately set on the basis of the desired time aperture ratios of the respective remaining sub-frame phases. As a result, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the above image display method, three or more sub-frame phases may be used as the N number of sub-frame phases, and when there is one sub-frame phase of a desired time aperture ratio that is larger than an average of the desired time aperture ratios in the three or more sub-frame phases, a modulation signal may be output to cause a difference of the display time aperture ratios between the largest desired time aperture ratio sub-frame phase and the second largest desired time aperture ratio sub-frame phase to approximate a difference of a desired time aperture ratios between the largest desired time aperture ratio sub-frame phase and the second largest desired time aperture ratio sub-frame phase.

In this case, when there is one sub-frame phase having a desired time aperture ratio larger than an average of the desired time aperture ratios in the three or more sub-frame phases, the corresponding display time aperture ratios can be appropriately set on the basis of the largest desired time aperture ratio and the second largest desired time aperture ratio. As a result, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the above image display method, three or more sub-frame phases may be used as the N number of sub-frame phases, and when there is one sub-frame phase of a desired time aperture ratio smaller than an average of the desired time aperture ratios in the three or more sub-frame phases, a modulation signal may be output to cause a difference of the display time aperture ratios between the respective sub-frame phases from the second smallest desired time aperture ratio sub-frame phase to the largest desired time aperture ratio sub-frame phase to approximate a difference of desired time aperture ratios between the corresponding sub-frame phases from the second smallest desired time aperture ratio sub-frame phase to the largest desired time aperture ratio sub-frame phase.

In this case, when there is one sub-frame phase having a desired time aperture ratio smaller than an average of the desired time aperture ratios in the three or more sub-frame phases, the corresponding display time aperture ratios can be set on the basis of the desired time aperture ratios of the respective remaining sub-frame phases. As a result, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the above image display method, three or more sub-frame phases may be used as the N number of sub-frame phases, and when there is one sub-frame phase of a desired time aperture ratio that is smaller than an average of the desired time aperture ratios in the three or more sub-frame phases, a modulation signal may be output to cause a difference of the display time aperture ratios between the smallest desired time aperture ratio sub-frame phase and the second smallest desired time aperture ratio sub-frame phase to approximate a difference of a desired time aperture ratios between the smallest desired time aperture ratio sub-frame phase and the second smallest desired time aperture ratio sub-frame phase.

In this case, when there is one sub-frame phase having a desired time aperture ratio smaller than an average of the desired time aperture ratios in the three or more sub-frame phases, the corresponding display time aperture ratios can be appropriately set in response to the smallest desired time aperture ratio and the second smallest desired time aperture ratio. As a result, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the above image display method, three or more sub-frame phases may be used as the N number of sub-frame phases, and when the desired time aperture ratios in three continuous sub-frame phases among the three or more sub-frame phases are respectively represented as A1, A2, and A3, and modulation signals in the three continuous sub-frame phases are respectively represented as S1, S2, and S3, and the following inequality (1) is satisfied with respect to thresholds T1, T2 prescribed by the response characteristics of the pixel array unit:

$$A1 \geq T2 > T1 \geq A2 \geq A3 \quad (1)$$

the modulation signals satisfy the following inequality (2):

$$S2 < S3 \quad (2).$$

In this case, when the desired time aperture ratios A1, A2, and A3 of the three continuous sub-frame phases satisfy the inequality (1) including the above thresholds T1, T2, the modulation signals S2, S3 may be appropriately determined in consideration of the response characteristics of the pixel array unit. As a result, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the above image display method, three or more sub-frame phases may be used as the N number of sub-frame phases, and
when the desired time aperture ratios in three continuous sub-frame phases among the three or more sub-frame phases are respectively represented as A4, A5, and A6, and modulation signals in the three continuous sub-frame phases are respectively represented as S4, S5, and S6, and the following inequality (3) is satisfied with respect to thresholds T3, T4 prescribed by the response characteristics of the pixel array unit:

$$A4 \leq T3 < T4 \leq A5 \leq A6 \quad (3)$$

the modulation signals satisfy the following inequality (4):

$$S5 > S6 \quad (4).$$

In this case, when the desired time aperture ratios A4, A5, and A6 of the three continuous sub-frame phases satisfy the inequality (3) including the above thresholds T3, T4, the modulation signals S5, S6 may be appropriately determined in consideration of the response characteristics of the pixel array unit. As a result, color variation of the display image caused by the inadequate response speed of the pixel array unit can be minimized and an image assumed by the input signal can be reproduced accurately by the display color of the display image actually displayed being able to further approximate the input image corresponding to the input image signal.

Moreover, in the above image display method, lighting intensities of the light source are preferably adjusted on the basis of the input image signal and light source control signals are preferably output to the display device.

In this case, since lighting of the light sources is driven on the basis of the input image signal, the power consumption of the display device can be reduced.

Moreover, in the above image display method, the light source control signals may be a plurality of pulsed signals that cause the light sources to perform a plurality of lighting operations during one sub-frame phase.

In this case, the occurrence of color shift due to the magnitude of the emission intensities can be suppressed by driving the light source lighting using the plurality of pulsed signals even when using a light source device in which the emission spectra changes due to the magnitude of the electric current amount.

Moreover, in the above image display method, light emission periods and light extinction periods in the plurality of lighting operations in the one sub-frame phase may each be equalized or made to approach equality.

In this case, the occurrence of color shift due to the magnitude of the emission intensities can be reliably suppressed even when using the above light source device.

Moreover, in the above image display method, light source control signals may be output to the display device for causing a light source of two or more colors to be lit among the plurality of light sources in at least one sub-frame phase among the N number of sub-frame phases.

In this case, an effect of concentrating display brightness in a specific sub-frame phase can be obtained, so that the occurrence of color breaking can be prevented or suppressed.

Moreover, in the above image display method, light source control signals for independently controlling lighting intensities of each light source or each set of a plurality of light sources may be output to a light source array unit composed of a plurality of light sources so that amounts of light reaching each pixel from each light source are different.

In this case, since lighting of each light source or each set of the plurality of light sources is driven, the power consumption of the display device can be reduced.

Effects of the Invention

According to the present invention, a display signal generator that can improve image quality, a display device that uses the same, and a method of image display can be provided.

BRIEF DESCRIPTION OF DRAWINGS

FIG. 5 is a detailed example of a modulation signal conversion table used by the modulation signal selecting unit illustrated in FIG. 1.

FIGS. 13A, 13B, 13C, 13D, 13E, 13F, and 13G are graphs that illustrate detailed waveforms of respective display time aperture ratios, red light source emission ratios, green light source emission ratios, blue light source emission ratios, red integrated brightness ratios, green integrated brightness ratios, and blue integrated brightness ratios that are integrated values in light source lighting periods of modulation degree waveforms in the display device illustrated in FIG. 12.

FIG. 15 describes a detailed example of a plurality of illumination areas provided in a light source array unit and a plurality of display areas illuminated by light from the illumination areas in the display device illustrated in FIG. 14.

DESCRIPTION OF THE INVENTION

Preferred embodiments of a display signal generator, a display device, and a method of image display according to the present invention will be described hereinbelow with reference to the accompanying drawings. The following description uses an example in which the present invention is applied to a transmissive liquid crystal display device. Moreover, the dimensions of the component parts in the figures are not faithful representations of the actual component part dimensions or dimensional proportions of the component parts.

First Embodiment

Figure 1:
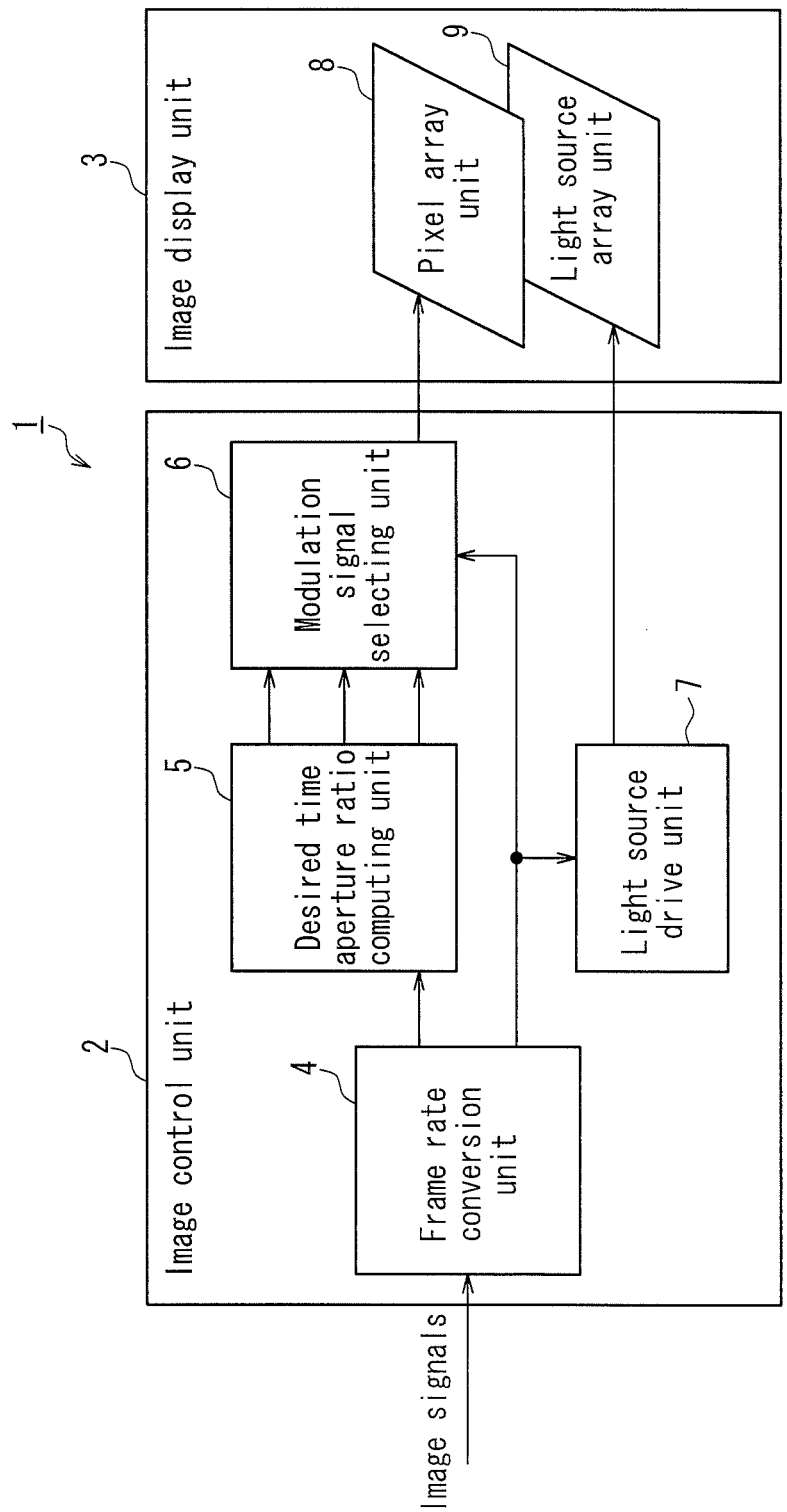
FIG. 1 describes an overall configuration of a display device according to a first embodiment of the present invention.

FIG. 1 describes an overall configuration of a display device according to a first embodiment of the present invention. In FIG. 1, a display device 1 according to the present embodiment includes an image control unit 2 to which image signals are input from outside, and an image display unit 3 that substantially displays images on the basis of control signals (instruction signals) from the image control unit 2. The image control unit 2 is provided with a frame rate conversion unit 4, a desired time aperture ratio computing unit 5, a modulation signal selecting unit 6, and a light source drive unit 7. As described later in detail, the image display unit 3 includes a pixel array unit 8 having a plurality of aligned pixels, and a light source array unit 9 having a plurality of light sources of different color components. The display device 1 according to the present embodiment is able to adjust display brightness by modulating light from the light sources, and is configured to reproduce, in each pixel, a display color of an input image corresponding to an input image signal by superposing N number (where N is an integer of two or more) of sub-frame phases in the time direction.

Figure 2:
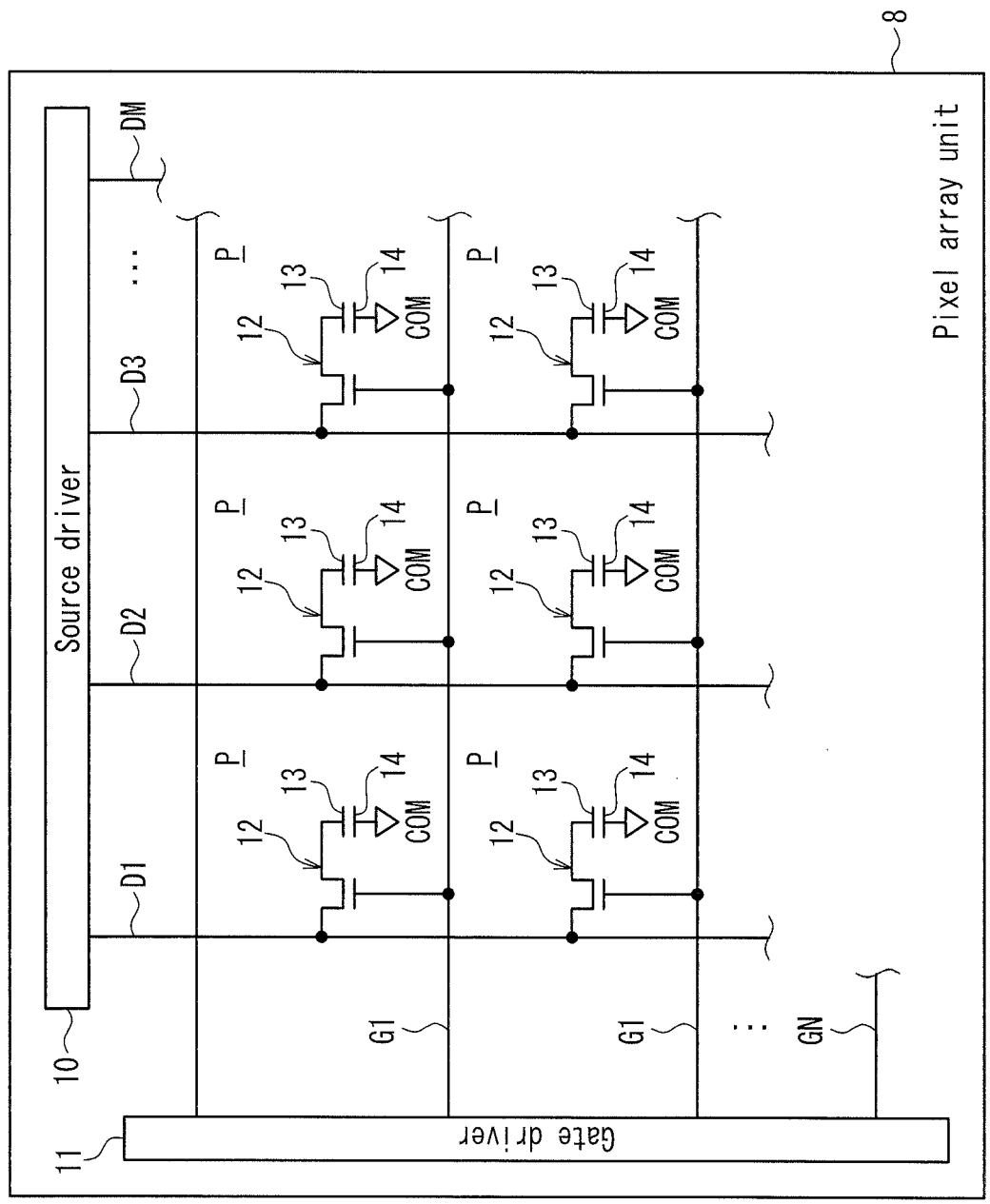
FIG. 2 describes a detailed configuration of a pixel array unit illustrated in FIG. 1.
Figure 3:
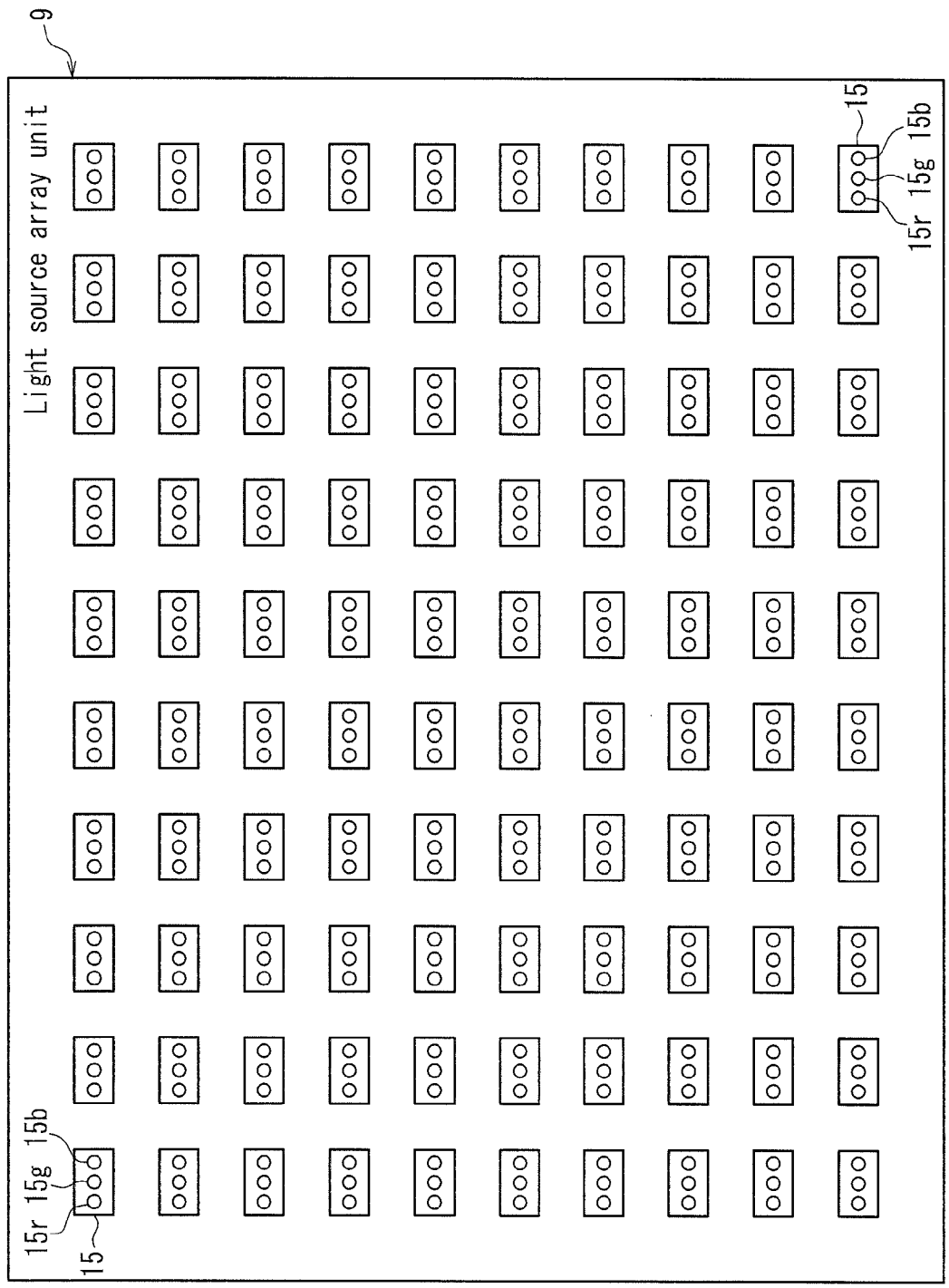
FIG. 3 describes a detailed configuration of a light source array unit illustrated in FIG. 1.

Now detailed explanations of the pixel array unit 8 and the light source array unit 9 will be provided with reference to FIGS. 2 and 3.

FIG. 2 describes a detailed configuration of a pixel array unit illustrated in FIG. 1. FIG. 3 describes a detailed configuration of a light source array unit illustrated in FIG. 1.

In FIG. 2, the pixel array unit 8 is used, for example, by a liquid crystal panel, and is provided with a source driver 10 and a gate driver 11. The source driver 10 and the gate driver 11 are drive circuits for driving a plurality of pixels P in pixel units provided in the pixel array unit 8. The source driver 10 and the gate driver 11 are respectively connected to a plurality of data lines D1 to DM (where M is an integer of two or more) and a plurality of gate lines G1 to GN (where N is an integer of two or more). The data lines D1 to DM and the gate lines G1 to GN are provided in a matrix arrangement, and areas of the abovementioned plurality of pixels P are formed in areas delineated by the matrix arrangement.

The pixel array unit 8 is not provided with a color filter. Each of the pixels P is configured to perform light modulation for modulating light from light sources and to function as red, green, and blue pixels due to the red-green-blue (RGB) light sources provided in the light source array unit 9 being successively lighting-driven. In the pixel array unit 8 of the present embodiment, as described below, N number of sub-frame phases, for example, three sub-frame phases, are set for one frame of an image signal, and a display color of an input image corresponding to an input image signal is reproduced in each pixel by the superposition in the time direction of the three sub-frame phases.

To each of the gate lines G1 to GN, a gate of a switching element 12 is connected. The switching element 12 is provided in each pixel P, and is used with a thin-film transistor, for example. To each of the data lines D1 to DM, a source of the switching element 12 is connected. A drain each of the switching elements 12 is connected to a pixel electrode 13 provided in each pixel P. Each of the pixels P is configured so that a common electrode 14 faces the pixel electrode 13 with a liquid crystal layer (not shown) provided in the pixel array unit 8 interposed therebetween.

Moreover, in the pixel array unit 8, below mentioned modulation signals are input from the modulation signal selecting unit 6 to the source driver 10. The source driver 10 appropriately outputs voltage signals corresponding to the input modulation signals to the data lines D1 to DM. The gate driver 11 sequentially outputs a gate signal that turns on the gate of the corresponding switching element 12 to the gate lines G1 to GN on the basis of the instruction signals from the image control unit 2. As a result, a modulation degree (transmittance and reflectance ratio) of each pixel P is modified for the display of the input image corresponding to the input image signal whereby the input image is displayed.

As illustrated in FIG. 3, a total of 100 light sources 15 are used in the light source array unit 8, with the light sources 15 composed of ten rows and ten columns provided in a parallel manner in the respective horizontal and vertical orientations of the display surface of the pixel array unit 8. A light-emitting diode, for example, used in each of the plurality of light sources 15 is integrally configured by red, green, and blue light sources 15$r$, 15$g$, and 15$b$ for emitting red (R), green (G), and blue (B) light, respectively, as a so-called three-in-one light-emitting diode type.

Light source control signals are input from the light source drive unit 7 in the light source array unit 9 of the present embodiment. As described below, the red, green, and blue light sources 15$r$, 15$g$, and 15$b$ are configured to perform successive lighting operations at fixed lighting ratios (e.g., lighting ratios of 100% for any of red, green, and blue) in each color in the three sub-frame phases in the light source array unit 9 of the present embodiment.

The frame timing of the input image signal and the number of phases of the sub-frame phase, which configures the display color, do not necessarily require synchronization. For example, when the display frame rate is set to tripled (number of phases of the sub-frame phases) with respect to the frame rate (e.g., 60 Hz) of the input image signal, the lighting on/off cycle becomes 60 Hz in the case of an image lit in only one sub-frame phase, and thereby a viewer may notice the flickering. Therefore, in the present embodiment, the display frame rate is set to quadrupled (e.g., 240 Hz) with respect to the input image signal frame rate (e.g., 60 Hz), and it is possible to suppress flickering by increasing the lighting on/off cycle of the abovementioned image lit in only one sub-frame phase to 80 Hz.

Returning to FIG. 1, the frame rate conversion unit 4 converts the frame rate of an input image signal to a certain display frame rate. The frame rate conversion method of the frame rate conversion unit 4 is not limited in any way. For example, when most of the display consists of still images, a specification in which the input image corresponding to the input image signal is simply output four times may be used, or frame rate conversion may be used that performs motion compensation processing between past and the latest input frame images when displaying moving images. The frame rate conversion unit 4 outputs converted image signal to the desired time aperture ratio computing unit 5 and outputs phase instruction signals for instructing the phase of the sub-frame phase, to the modulation signal selecting unit 6 and the light source drive unit 7.

The light source drive unit 7 outputs light source control signals to the light source array unit 9 so that the red, green, and blue light sources 15$r$, 15$g$, and 15$b$ perform successive lighting operations at light source emission ratios of 100% in the three sub-frame phases on the basis of the phase instruction signals from the frame rate conversion unit 4. As a result, for example, the red light source 15$r$ is lit at a lighting ratio of 100% in a first sub-frame phase, the green light source 15$g$ is lit at a lighting ratio of 100% in a second sub-frame phase, and the blue light source 15$b$ is lit at a lighting ratio of 100% in a third sub-frame phase among the three sub-frame phases in the light source array unit 9.

The desired time aperture ratio computing unit 5 computes a desired time aperture ratio in each pixel in the pixel array unit 8 in relation to the three sub-frame phases in order to reproduce an integrated brightness of each color corresponding to the input image signal with lighting light of the light source array unit 9. Namely, the desired time aperture ratio computing unit 5 is configured that a combination of desired time aperture ratios is obtained for each pixel in the three sub-frame phases in order to display the input images corresponding to the input image signal. And the desired time aperture ratio computing unit 5 outputs the obtained combination of desired time aperture ratios to the modulation signal selecting unit 6.

The modulation signal selecting unit 6 sets a combination of display time aperture ratios in the three sub-frame phases when the display color is actually reproduced from the desired time aperture ratios from the desired time aperture ratio computing unit 5 on the basis of the response characteristics of the pixel array unit 8. And the modulation signal selecting unit 6 outputs a modulation signal for implementing the combination of set display time aperture ratios to the pixel array unit 8 (display device 1).

Moreover, the modulation signal selecting unit 6 may be configured as a computing processor for executing a computing circuit or a software program in accordance with the response characteristics of the pixel array unit 8. Alternatively, the modulation signal selecting unit 6 may be provided with a look-up table saving relationships between the desired time aperture ratios and the modulation signals by implementing brightness measurements measured with a brightness measuring device and the like at a design stage of the display device 1. Moreover, if the response speed of the pixel array unit 8 has a temperature dependency, a temperature detection device may be provided so that an appropriate modulation signal is preferably selected without relying on the temperature by modifying look-up table selections selected by the modulation signal selecting unit 6 on the basis of detected temperatures and modifying parameters of functions of the abovementioned computing circuit or computing processor.

Additionally, the desired time aperture ratio computing unit 5, the modulation signal selecting unit 6, and the light source drive unit 7 configure a display signal generator of the present embodiment. When the number of sub-frame phases (number of phases) used to reproduce one display color is N, the display signal generator of the present embodiment is configured to select a combination of modulation signals corresponding to a combination of desired time aperture ratios in each of the N number of sub-frame phases, so that accurate image display can be performed (similar to the following embodiments).

Furthermore, obtaining a display time aperture ratio corresponding to a desired time aperture ratio may be difficult when using a pixel array unit 8 in which changes in modulation degrees (e.g., transmittance or reflectance ratio and the like) are slow after modulation signals having a slow response speed such as liquid crystal are provided. However, the display signal generator of the present embodiment is configured to select a modulation signal that can implement an optimal display time aperture ratio within a possible range even in the case of the above (details will be described below).

Operations of the liquid crystal display device 1 according to the present embodiment and configured as described above will now be explained in more detail with reference to FIGS. 4 to 7.

Figure 4A:
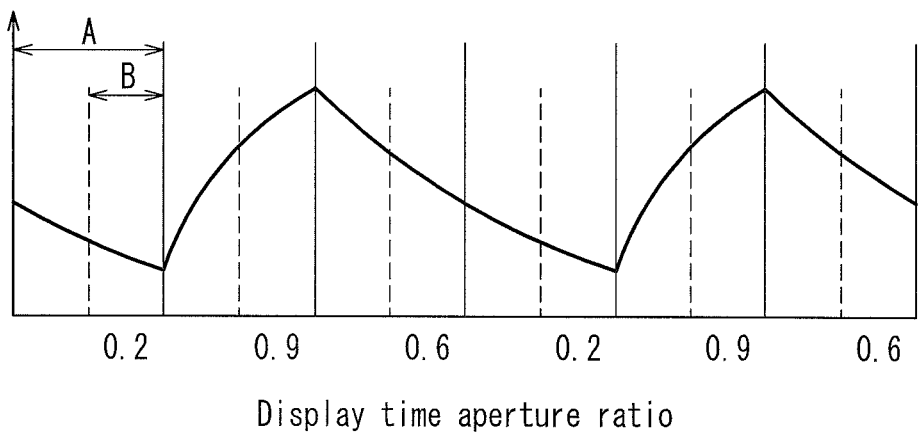
FIGS. 4A, 4B, and 4C are graphs of detailed waveform examples of respective display time aperture ratios, light source emission ratios, and integrated brightness ratios that determine modulation degrees.
Figure 4B:
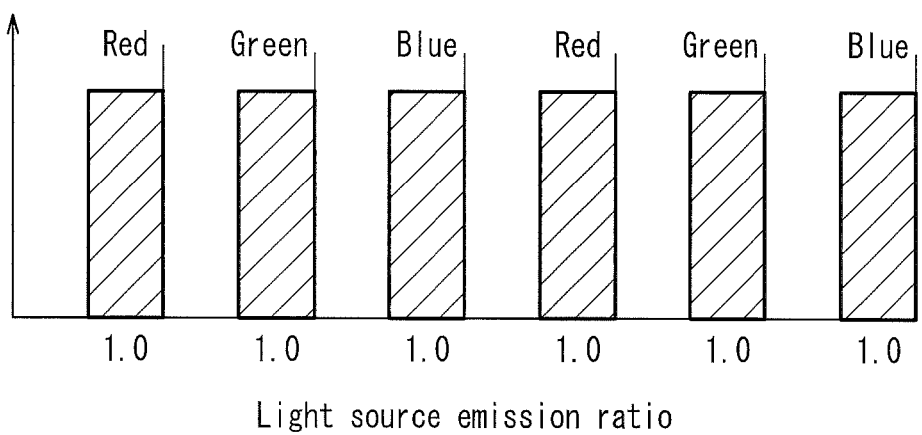
Figure 4C:
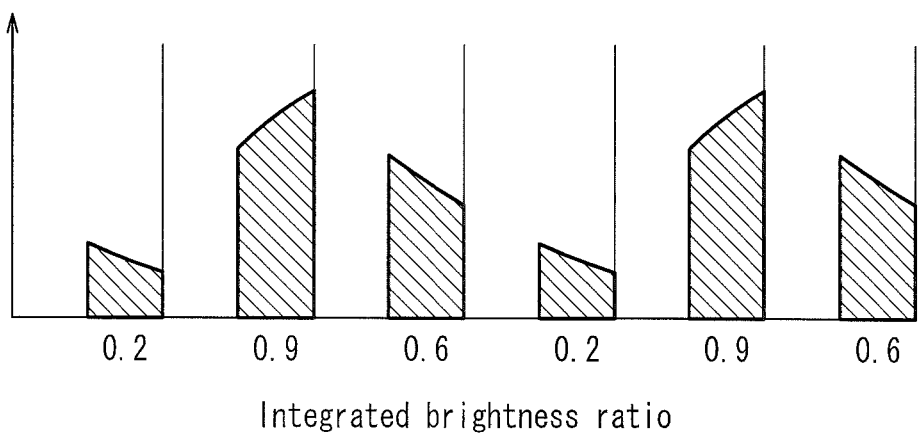
Figure 6A:
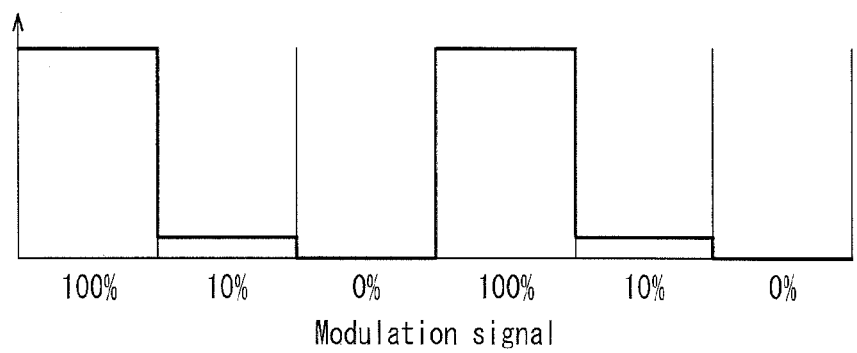
FIGS. 6A and 6B are graphs illustrating detailed waveform examples of respective modulation signals and display time aperture ratios of a comparative example.
Figure 6B:
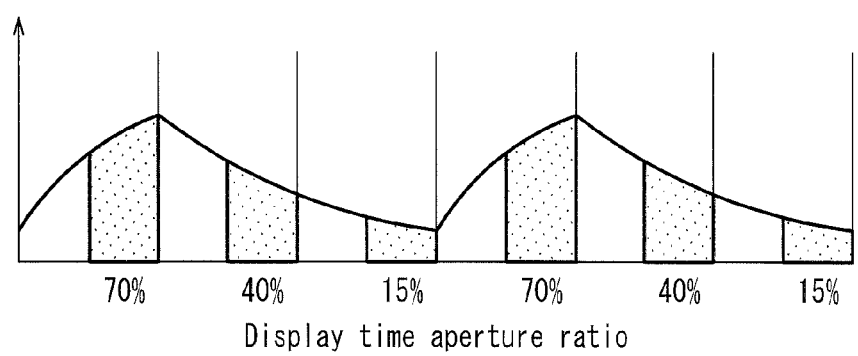
Figure 6C:
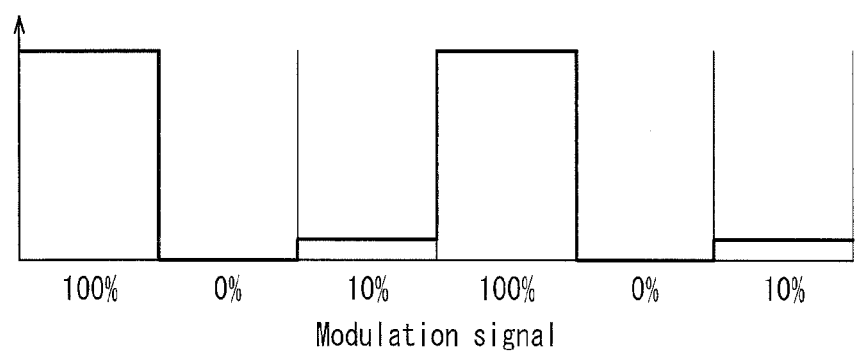
FIGS. 6C and 6D are graphs illustrating detailed waveform examples of respective modulation signals and display time aperture ratios of a present embodiment example.
Figure 6D:
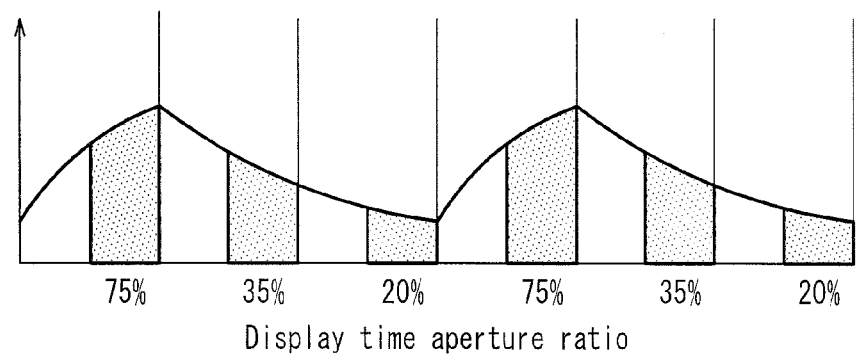
Figure 7A:
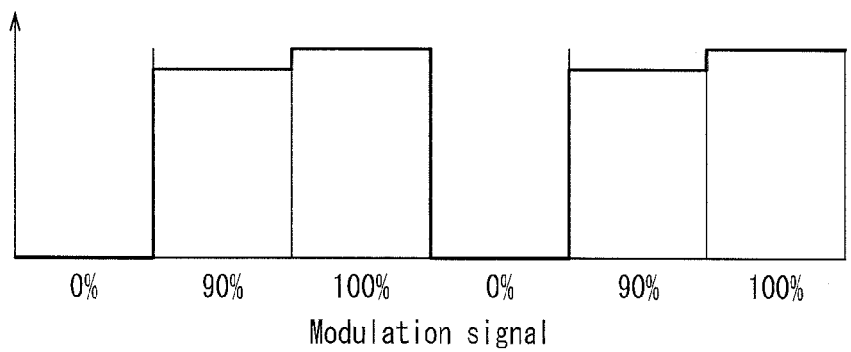
FIGS. 7A and 7B are graphs illustrating other detailed waveform examples of respective modulation signals and display time aperture ratios of the comparative example.
Figure 7B:
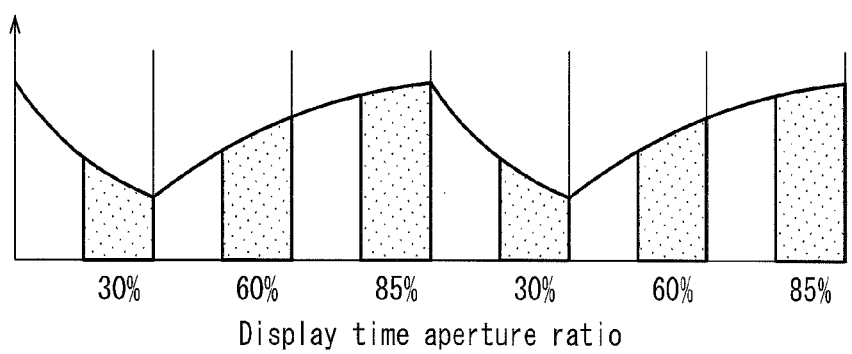
Figure 7C:
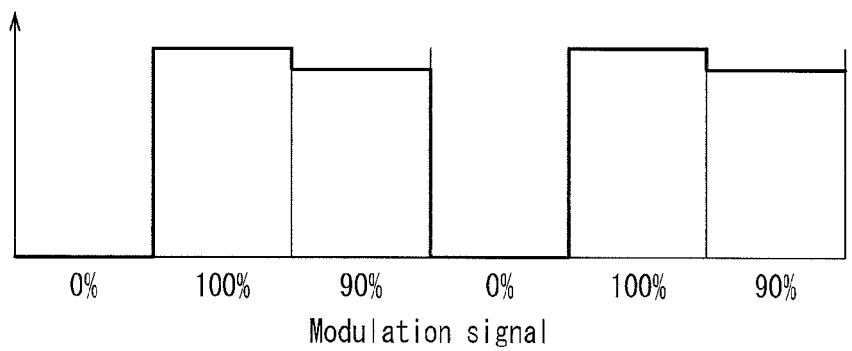
FIGS. 7C and 7D are graphs illustrating other detailed waveform examples of respective modulation signals and display time aperture ratios of the present embodiment example.
Figure 7D:
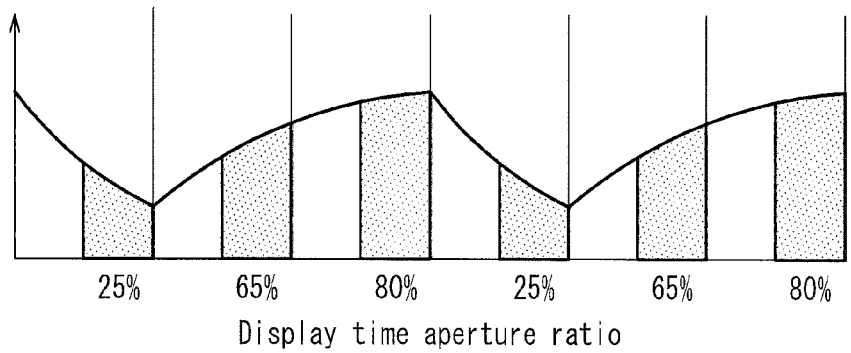

FIGS. 4A, 4B, and 4C are graphs of detailed waveform examples of respective display time aperture ratios, light source emission ratios, and integrated brightness ratios that determine modulation degrees. FIG. 5 is a detailed example of a modulation signal conversion table used by the modulation signal selecting unit illustrated in FIG. 1. FIGS. 6A and 6B are graphs illustrating detailed waveform examples of respective modulation signals and display time aperture ratios of a comparative example, and FIGS. 6C and 6D are graphs illustrating detailed waveform examples of respective modulation signals and display time aperture ratios of a present embodiment example. FIGS. 7A and 7B are graphs illustrating other detailed waveform examples of respective modulation signals and display time aperture ratios of the comparative example, and FIGS. 7C and 7D are graphs illustrating other detailed waveform examples of respective modulation signals and display time aperture ratios of the present embodiment example.

Basic operations of the display device 1 according to the present embodiment will be described with reference to FIGS. 4 and 5.

In FIG. 4, superpositions of a modulation degree waveform in the pixel array unit 8 and a light emission waveform in the light source array unit 9 are set in the modulation signal selecting unit 6 and the light source drive unit 7 in order to implement the integrated brightness displayed in the image display unit 3 on the basis of an image signal of the display frame rate converted by the frame rate conversion unit 4 during the operation of the display device 1. That is, the integrated brightness displayed in a certain sub-frame phase of a certain pixel is determined by the integration of a modulation degree waveform at the pixel array unit 8 response-altered on the basis of the modulation signal from the modulation signal selecting unit 6 and a light emission brightness waveform at the light sources 15 emitting light on the basis of the light source control signals from the light source drive unit 7. If the display time aperture ratio of the pixel array unit 8 is assumed to be a value obtained by normalizing the maximum integration value of the modulation degree waveform in a light source emission period as 1, and the emission ratio is assumed to be a value obtained by normalizing the maximum brightness integration in a light source emission period as 1, the integrated brightness displayed in a certain sub-frame phase of a certain pixel is determined by the integration of the display time aperture ratio and the lighting ratio.

Specifically, in the display device 1 of the present embodiment, the lighting period of the light sources 15 in the light source array unit 9 is set to a period that is around 50% and the latter half of a period A of one sub-frame phase. The desired time aperture ratio computing unit 5 then obtains the combination of the desired time aperture ratios in the three sub-frame phases for each pixel on the basis of the input image signal and outputs the obtained combination of the desired time aperture ratios to the modulation signal selecting unit 6.

The modulation signal selecting unit 6 uses a table illustrated in FIG. 5, for example, to select a combination of modulation signals to implement the combination of display time aperture ratios from the combination of the desired time aperture ratios from the desired time aperture ratio computing unit 5, and outputs the selected combination of modulation signals to the pixel array unit 8 as modulation signals. As a result, the display time aperture ratios of the pixel array unit 8 in the first, second, and third sub-frame phases are, for example, 0.2, 0.9, and 0.6 respectively as illustrated in FIG. 4A. The display time aperture ratios illustrated in FIG. 4A are represented with values normalized to, for example, a maximum of 1 and a minimum of 0.

The light source drive unit 7 outputs light source control signals to the light source array unit 9 so that red, green, and blue are illuminated with a light source emission ratio of 1.0 (i.e., a lighting ratio of 100%) as illustrated in FIG. 4B in the first, second, and third sub-frame phases. As illustrated in FIG. 4B, when emissions at the light source 15 rise sharply so that the brightness in the lighting period is uniform, and then the emissions fall sharply, the display integrated brightness can be approximated with the integration of the display time aperture ratio and the light source emission ratio. As a result, the integrated brightness ratios of the image display unit 3 in the first, second, and third sub-frame phases are 0.2, 0.9, and 0.6 respectively as illustrated in FIG. 4C. The integrated brightness ratios illustrated in FIG. 4C are represented with values normalized to, for example, a maximum of 1 and a minimum of 0.

In the case that the input image signal does not change, the combination of the modulation signals in the abovementioned three sub-frame phases does not change when the modulation signals are selected from the desired time aperture ratios in the modulation signal selecting unit 6. Thereby, in the display device 1, the display image is stable. Moreover, since alternating current components of the brightness changes are not generated at frequencies slower than the frame rate of the input image signal, flickering and the like of such slow frequencies does not occur.

Furthermore, in the display signal generator according to the present embodiment, the image of the input image signal can be reproduced if the response speed of the pixel array unit 8 is sufficient and the desired time aperture ratios in each sub-frame phase can be implemented. Conversely, when the desired time aperture ratios of the sub-frame phases cannot be implemented due to a slow response speed of the pixel array unit 8, a modulation signal for implementing the combination of the display time aperture ratios is output to cause hue of a display color displayed by the superposition of the three sub-frame phases in the time direction to approximate the hue of the input image corresponding to the input image signal. As a result, the hue of the actually displayed display color approximates the hue of the above input image and display quality in the display device 1 can be improved.

The following is an explanation of operation examples of the display device 1 when obtaining the display time aperture ratio in accordance with the desired time aperture ratio is difficult, with reference to FIGS. 6 and 7.

First, an explanation of an operation example with a comparative example will be explained with reference to FIGS. 6A and 6B. The comparative example is different from the present embodiment example in that the display signal generator is configured to only output modulation signals in accordance with the desired time aperture ratio without setting a combination of display time aperture ratios from a combination of the desired time aperture ratios on the basis of the response characteristics of the pixel array unit 8.

Specifically, when, for example, the desired time aperture ratios of the first, second, and third sub-frame phases are respectively 100%, 10%, and 0%, the modulation signals supplied to the first, second, and third sub-frame phases are respectively 100%, 10%, and 0% as illustrated in FIG. 6A. When conducting still image display that repeats this type of combination of modulation signals, the display time aperture ratios of the first, second, and third sub-frame phases are respectively 70%, 40%, and 15% in the comparative example as illustrated in FIG. 6B since the pixel array unit response speed is slow.

On the other hand, in the present embodiment example, the display signal generator is configured to set a combination of display time aperture ratios from a combination of the desired time aperture ratios on the basis of the response characteristics of the pixel array unit 8 and output the modulation signals to implement the set combination of display time aperture ratios. As a result, the present embodiment example is able to perform color display relatively closer to the input image signal request.

Specifically, in the display signal generator of the present embodiment, when there is one sub-frame phase of a desired time aperture ratio larger than the average of the desired time aperture ratios in the three or more sub-frame phases when three or more sub-frame phases are used as N number of sub-frame phases, a modulation signal is output to cause the difference of the display time aperture ratios between the respective sub-frame phases from the second largest desired time aperture ratio sub-frame phase to the smallest desired time aperture ratio sub-frame phase to approximate the difference of the desired time aperture ratios between the corresponding sub-frame phases from the second largest desired time aperture ratio sub-frame phase to the smallest desired time aperture ratio sub-frame phase. Thereby, when there is one sub-frame phase having a desired time aperture ratio larger than the average of the desired time aperture ratios among the three or more sub-frame phases, the corresponding display time aperture ratios can be appropriately set on the basis of the desired time aperture ratios of the respective remaining sub-frame phases. As a result, color variation of the display image caused by inadequate response speed of the pixel array unit 8 can be minimized and an image assumed by the input image signal can be reproduced accurately in the display device 1 by the display color of the display image actually displayed being able to further approximate the input image corresponding to the input image signal.

Moreover, when there is one sub-frame phase of a desired time aperture ratio that is larger than the average of the desired time aperture ratios in the three or more sub-frame phases, a modulation signal is output to cause the difference of the display time aperture ratios between the largest desired time aperture ratio sub-frame phase and the second largest desired time aperture ratio sub-frame phase to approximate the difference of a desired time aperture ratios between the largest desired time aperture ratio sub-frame phase and the second largest desired time aperture ratio sub-frame phase. Thereby, in the present embodiment, when there is one sub-frame phase having a desired time aperture ratio larger than the average of the desired time aperture ratios among the three or more sub-frame phases, the corresponding display time aperture ratios can be appropriately set on the basis of the largest desired time aperture ratio and the second largest desired time aperture ratio. As a result, color variation of the display images caused by the inadequate response speed of the pixel array unit 8 can be minimized and an image assumed by the input image signal can be reproduced accurately in the display device 1 due to the display colors of the display images actually displayed being able to further approximate the input image corresponding to the input image signal.

Further, when the following inequality (1) is satisfied with respect to thresholds T1, T2 prescribed by the response characteristics of the pixel array unit 8, where the desired time aperture ratios in three continuous sub-frame phases among three or more sub-frame phases are respectively represented as A1, A2, and A3, and modulation signals in the three continuous sub-frame phases are respectively represented as S1, S2, and S3, $$A1 \geq T2 > T1 \geq A2 \geq A3 \qquad (1)$$

the modulation signals are configured to satisfy the following inequality (2):

$$S2 < S3 \qquad (2).$$

Thereby, when the desired time aperture ratios A1, A2, and A3 of the three continuous sub-frame phases satisfy the inequality (1) including the above thresholds T1, T2, the modulation signals S2, S3 can be appropriately determined in consideration of the response characteristics of the pixel array unit 8. As a result, the display colors of the display images actually displayed are able to further approximate the input image corresponding to the input image signal, and an image assumed by the input image signal can be reproduced accurately in the display device 1.

More specifically, when, for example, the desired time aperture ratios of the first, second, and third sub-frame phases are respectively 100%, 10%, and 0% in the present embodiment example, the modulation signals supplied to first, second, and third sub-frame phases are respectively 100%, 0%, and 10% as illustrated in FIG. 6C. When conducting still image display that repeats this type of combination of modulation signals, the display time aperture ratios of the first, second, and third sub-frame phases are respectively 75%, 35%, and 20% in the present embodiment example as illustrated in FIG. 6D.

That is, the display time aperture ratio of the second sub-frame phase in the present embodiment example falls below the 40% of the comparative example, the display time aperture ratio of the third sub-frame phase rises slightly above the 15% of the comparative example, and the display time aperture ratio of the subsequent first sub-frame phase can be raised by slightly raising the response attainment level when the third sub-frame phase is finished. Thereby, the difference (15%=35%−20%) of the display time aperture ratios between the second largest desired time aperture ratio sub-frame phase and the third largest desired time aperture ratio sub-frame phase is able to approximate the difference (10%=10%−0%) of the desired time aperture ratios between the second largest desired time aperture ratio sub-frame phase and the third largest desired time aperture ratio sub-frame phase. That is, the present embodiment example is able to more closely approximate the difference of the desired time aperture ratios of 10% when compared to the difference (25%=40%−15%) of the display time aperture ratios between the second largest desired time aperture ratio sub-frame phase and the third largest desired time aperture ratio sub-frame phase in the comparative example.

Moreover, the difference (40%=75%−35%) of the display time aperture ratios between the largest desired time aperture ratio sub-frame phase and the second largest desired time aperture ratio sub-frame phase is able to approximate the difference (90%=100%−10%) of the desired time aperture ratios between the largest desired time aperture ratio sub-frame phase and the second largest desired time aperture ratio sub-frame phase. That is, the present embodiment example is able to more closely approximate the difference of the desired time aperture ratios of 90% when compared to the difference (30%=70%−40%) of the display time aperture ratios between the largest desired time aperture ratio sub-frame phase and the second largest desired time aperture ratio sub-frame phase in the comparative example. The present embodiment example according to the above configuration is able to perform color display relatively closer to the request of the input image signal in comparison to the comparative example.

Looking at the display time aperture ratio of the third sub-frame phase, the display time aperture ratio of the third sub-frame phase in the present embodiment example is set to 20%, and this display time aperture ratio is further away from the desired time aperture ratio of 0% in comparison to 15% in the comparative example. The present embodiment example has a feature that is different from an overshoot drive that simply approximates the aperture ratios of each sub-frame phase to a target.

In the present embodiment example as illustrated in FIG. 4B, the red-green-blue light-emitting diodes (light sources) 15 are configured to perform lighting driving independently from each other in the first to third sub-frame phases. Therefore, in the display signal generator of the present embodiment, a modulation signal for implementing the combination of the display time aperture ratios is output to cause the difference between the smallest primary color component and the second smallest primary color component when a display color displayed by the superposition of N number of sub-frame phases in the time direction is represented with the three primary colors of red, green, and blue, to approximate the difference between the smallest primary color component and the second smallest primary color component when the input image corresponding to the input image signal is represented with the three primary colors of red, green, and blue (this is the same in the following case illustrated in FIG. 7). Thereby, in the present embodiment, the display color of the display image actually displayed is able to further approximate the input image corresponding to the input image signal, and an image assumed by the input image signal can be reproduced accurately in the display device.

Further, in the display signal generator of the present embodiment, a modulation signal for implementing the combination of the display time aperture ratios is output to cause the difference between the largest primary color component and the second largest primary color component when a display color displayed by the superposition of N number of sub-frame phases in the time direction is represented with the three primary colors of red, green, and blue, to approximate the difference between the largest primary color component and the second largest primary color component when an input image corresponding to an input image signal is represented with the three primary colors of red, green, and blue (this is the same in the following case illustrated in FIG. 7). Thereby, the display color of the display image actually displayed is able to further approximate the input image corresponding to the input image signal, and an image assumed by the input image signal can be reproduced accurately in the display device 1.

An explanation of another operation example with the above comparative example will be explained with reference to FIGS. 7A and 7B.

Specifically, when, for example, the desired time aperture ratios of the first, second, and third sub-frame phases are respectively 0%, 90%, and 100%, the modulation signals supplied in first, second, and third sub-frame phases are respectively 0%, 90%, and 100% in the comparative example as illustrated in FIG. 7A. When conducting still image display that repeats this type of combination of modulation signals, the display time aperture ratios of the first, second, and third sub-frame phases are respectively 30%, 60%, and 85% in the comparative example as illustrated in FIG. 7B.

On the other hand, in the present embodiment example, the display signal generator is configured to set a combination of display time aperture ratios from a combination of the desired time aperture ratios on the basis of the response characteristics of the pixel array unit 8 and output the modulation signals to implement the set combination of display time aperture ratios. Thereby, the present embodiment example is able to perform color display relatively closer to the input image signal request.

Specifically, in the display signal generator of the present embodiment, when there is one sub-frame phase of a desired time aperture ratio smaller than the average of the desired time aperture ratios in the three or more sub-frame phases when three or more sub-frame phases are used as N number of sub-frame phases, a modulation signal is output to cause the difference of the display time aperture ratios between the respective sub-frame phases from the second smallest desired time aperture ratio sub-frame phase to the largest desired time aperture ratio sub-frame phase to approximate the difference of the desired time aperture ratios between the corresponding sub-frame phases from the second smallest desired time aperture ratio sub-frame phase to the largest desired time aperture ratio sub-frame phase. Thereby, when there is one sub-frame phase having a desired time aperture ratio smaller than the average of the desired time aperture ratios among the three or more sub-frame phases, the corresponding display time aperture ratios can be appropriately set on the basis of the desired time aperture ratios of the respective remaining sub-frame phases. As a result, the display color of the display image actually displayed is able to further approximate the input image corresponding to the input image signal, and an image assumed by the input image signal can be reproduced accurately in the display device 1.

Moreover, when there is one sub-frame phase of a desired time aperture ratio that is smaller than the average of the desired time aperture ratios in the three or more sub-frame phases, a modulation signal is output to cause the difference of the display time aperture ratios between the smallest desired time aperture ratio sub-frame phase and the second smallest desired time aperture ratio sub-frame phase to approximate the difference of the desired time aperture ratios between the smallest desired time aperture ratio sub-frame phase and the second smallest desired time aperture ratio sub-frame phase. Thereby, in the present embodiment, when there is one sub-frame phase having a desired time aperture ratio smaller than the average of the desired time aperture ratios among the three or more sub-frame phases, the corresponding display time aperture ratios can be appropriately set on the basis of the smallest desired time aperture ratio and the second smallest desired time aperture ratio. As a result, the display color of the display image actually displayed is able to further approximate the input image corresponding to the input image signal, and an image assumed by the input image signal can be reproduced accurately in the display device 1.

Further, when the following inequality (3) is satisfied with respect to thresholds T3, T4 prescribed by the response characteristics of the pixel array unit where the desired time aperture ratios in three continuous sub-frame phases among three or more sub-frame phases in the display signal generator of the present embodiment are respectively represented as A4, A5, and A6, and modulation signals in the three continuous sub-frame phases are respectively represented as S4, S5, and S6:

$$A4 \leq T3 < T4 \leq A5 \leq A6 \qquad (3)$$

the modulation signals satisfy the following inequality (4):

$$S5 > S6 \qquad (4).$$

Thereby, when the desired time aperture ratios A4, A5, and A6 of the three continuous sub-frame phases satisfy the inequality (3) including the above thresholds T3, T4, the modulation signals S5, S6 can be appropriately determined in consideration of the response characteristics of the pixel array unit 8. As a result, the display color of the display image actually displayed is able to further approximate the input image corresponding to the input image signal, and an image assumed by the input image signal can be reproduced accurately in the display device 1.

More specifically, when, for example, the desired time aperture ratios of the first, second, and third sub-frame phases are respectively 0%, 90%, and 100% in the present embodiment example, the modulation signals supplied in the first, second, and third sub-frame phases are respectively 0%, 100%, and 90% as illustrated in FIG. 7C. When conducting still image display that repeats this type of combination of modulation signals, the display time aperture ratios of the first, second, and third sub-frame phases are respectively 25%, 65%, and 80% in the present embodiment example as illustrated in FIG. 7D.

That is, the display time aperture ratio of the second sub-frame phase in the present embodiment example rises above the 60% of the comparative example, the display time aperture ratio of the third sub-frame phase falls slightly below the 85% of the comparative example, and the display time aperture ratio of the subsequent first sub-frame phase can be raised by a slightly drop of the response attainment level when the third sub-frame phase is finished. Thereby, the difference (15%=80%−65%) of the display time aperture ratios between the second smallest desired time aperture ratio sub-frame phase and the third smallest desired time aperture ratio sub-frame phase is able to approximate the difference (10%=100%−90%) of the desired time aperture ratios between the second smallest desired time aperture ratio sub-frame phase and the third smallest desired time aperture ratio sub-frame phase.

That is, the present embodiment example is able to more closely approximate the difference of the desired time aperture ratios of 10% when compared to the difference (25%=85%−60%) of the display time aperture ratios between the second smallest desired time aperture ratio sub-frame phase and the third smallest desired time aperture ratio sub-frame phase in the comparative example.

Moreover, the difference (40%=65%−25%) of the display time aperture ratios between the smallest desired time aperture ratio sub-frame phase and the second smallest desired time aperture ratio sub-frame phase is able to approximate the difference (90%=100%−10%) of the desired time aperture ratios between the smallest desired time aperture ratio sub-frame phase and the second smallest desired time aperture ratio sub-frame phase. That is, the present embodiment example is able to more closely approximate the difference of the display time aperture ratios of 90% when compared to the difference (30%=60%−30%) of the desired time aperture ratios between the smallest desired time aperture ratio sub-frame phase and the second smallest desired time aperture ratio sub-frame phase in the comparative example.

The present embodiment example according to the above configuration is able to perform color display relatively closer to the request of the input image signal in comparison to the comparative example.

Looking at the display time aperture ratio of the third sub-frame phase, the display time aperture ratio of the third sub-frame phase in the present embodiment example is set to 80%, and this display time aperture ratio is further away from the desired time aperture ratio of 100% in comparison to 85% in the comparative example. Moreover, the present embodiment example has a feature that differs from an overshoot drive that simply approximates the aperture ratios of each sub-frame phase to a target.

In the present embodiment configured as described above, a combination of desired time aperture ratios are obtained for each pixel P in three sub-frame phases in order to display the input image corresponding to the input image signal. Additionally, the combination of display time aperture ratios in three sub-frame phases is set from the combination of desired time aperture ratios so that the actual display color more closely approximates the input image corresponding to the input image signal on the basis of the response characteristics of the pixel array unit 8, and the modulation signal for implementing the set combination of display time aperture ratios is output to the liquid crystal display device 1. As a result, unlike the above prior art, an image assumed by the input image signal can be reproduced accurately in the display device 1 according to the present embodiment.

In the present embodiment, a high performance display device 1 demonstrating excellent display quality can be easily configured even when performing color display using light sources and a pixel array unit, which is not provided with a color filter, having slow response speed, since the above display signal generator that can accurately reproduce images assumed by the input image signals is used.

Second Embodiment

Figure 8:
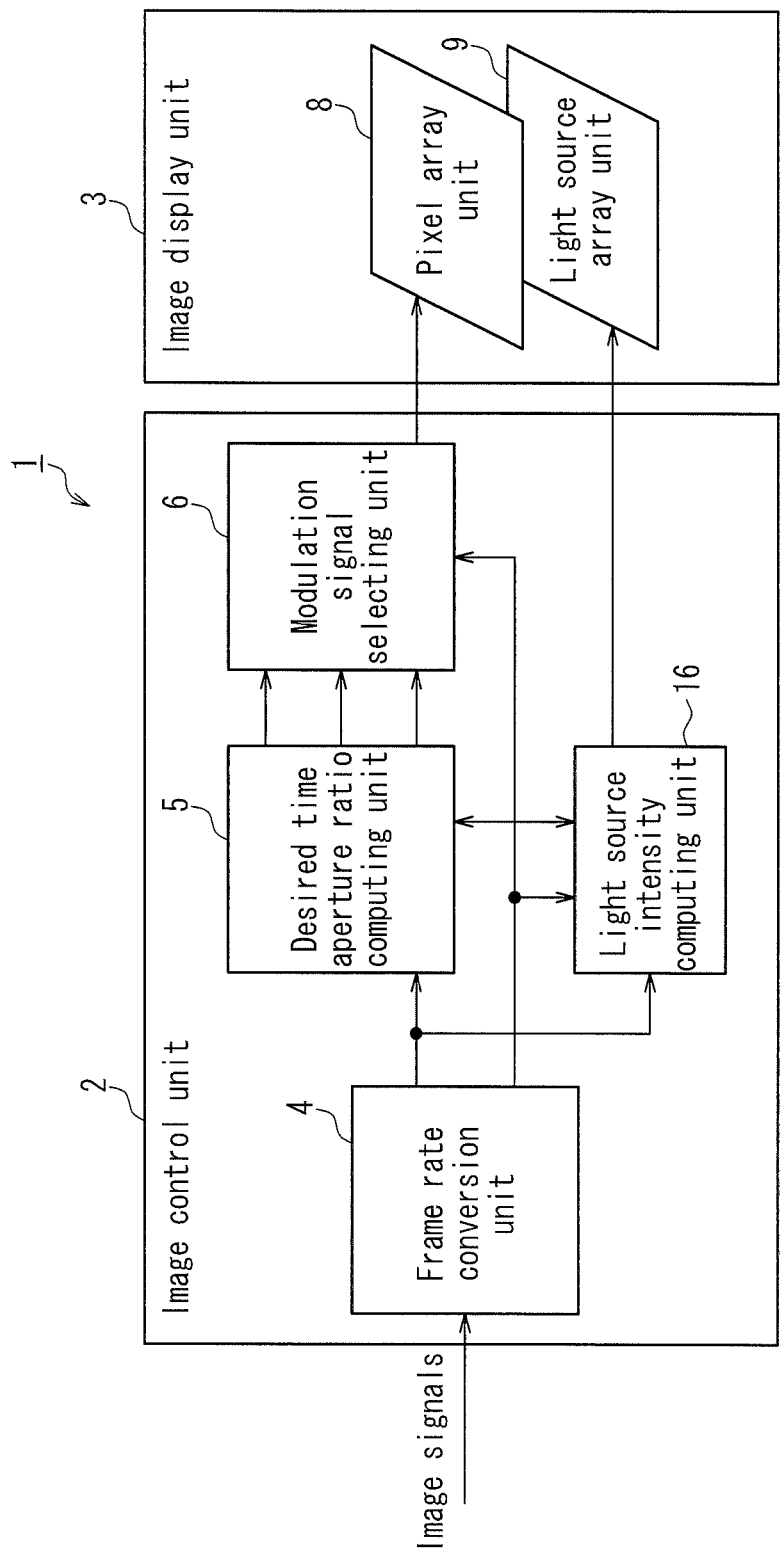
FIG. 8 describes an overall configuration of a display device according to a second embodiment of the present invention.
Figure 9A:
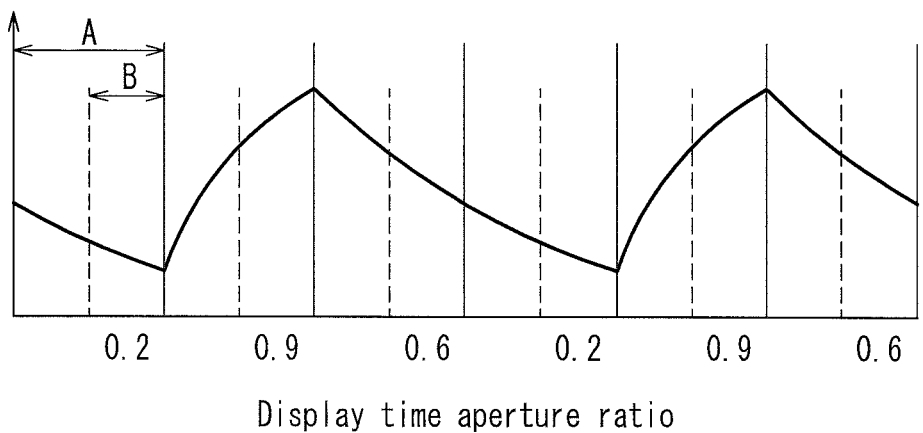
FIGS. 9A, 9B, and 9C are graphs of detailed waveform examples of respective display time aperture ratios, light source emission ratios, and integrated brightness ratios that determine modulation degrees in the display device illustrated in FIG. 8.
Figure 9B:
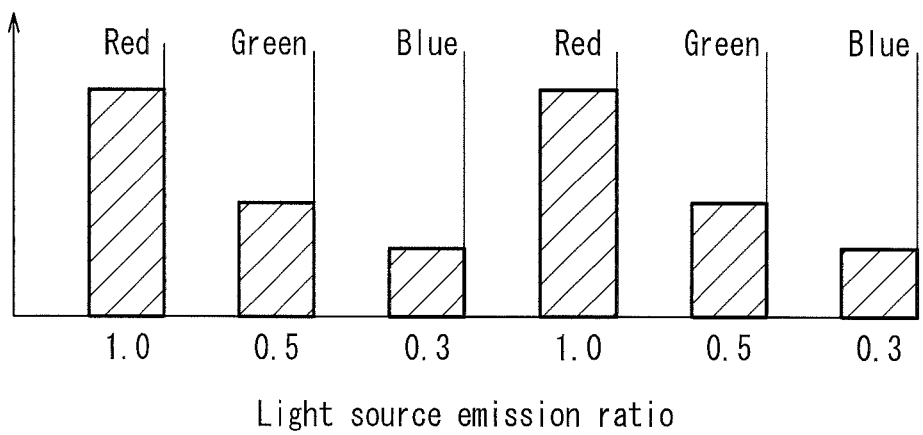
Figure 9C:
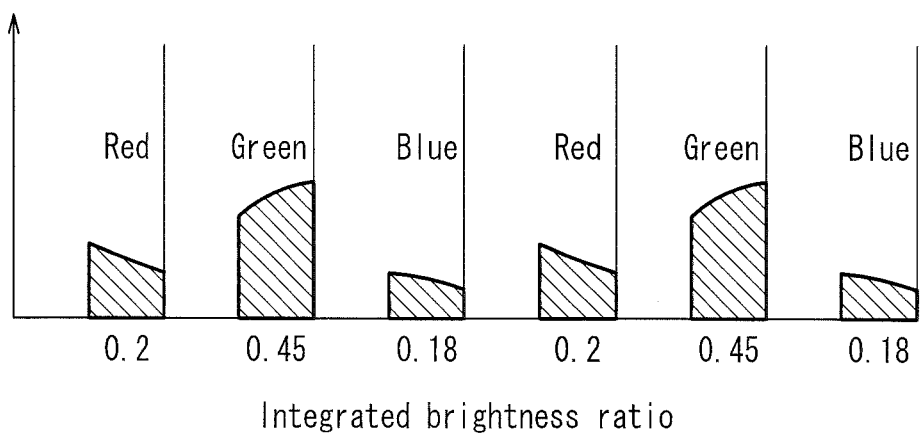

FIG. 8 describes an overall configuration of a display device according to a second embodiment of the present invention. FIGS. 9A, 9B, and 9C are graphs of detailed waveform examples of respective display time aperture ratios, light source emission ratios, and integrated brightness ratios that determine modulation degrees in the display device illustrated in FIG. 8. A main difference in the drawings between the present embodiment and the above first embodiment is that a light source intensity computing unit adjusts the lighting intensity of the light sources on the basis of the input image signal to output light source control signals. Elements in common with the above first embodiment are given the same reference numeral and explanations thereof will be omitted.

Specifically, as illustrated in FIG. 8, the light source driving unit of the first embodiment is replaced and a light source intensity computing unit 16 is provided in the present embodiment. Phase instruction signals and converted image signals are input from the frame rate conversion unit 4 to the light source intensity computing unit 16. The light source intensity computing unit 16 is connected to the desired time aperture ratio computing unit 5. The light source intensity computing unit 16 computes the lighting intensities of the first to third sub-frame phases in order to reproduce the integrated brightness of each color corresponding to the input image signal with modulation degrees of the pixel array unit 8, and outputs lighting control signals to the light source array unit 9. Specifically, the light source intensity computing unit 16 adjusts the lighting intensities of the light sources 15 on the basis of the input image signal to output light source control signals.

Additionally, the desired time aperture ratio computing unit 5, the modulation signal selecting unit 6, and the light source intensity computing unit 16 configure a display signal generator of the present embodiment.

Superpositions of a modulation degree waveform of the light source lighting periods in the pixel array unit 8 and a light emission waveform in the light source array unit 9 are set in the modulation signal selecting unit 6 and the light source intensity computing unit 16 in order to implement the integrated brightness displayed in the image display unit 3 on the basis of an image signal of the display frame rate converted by the frame rate conversion unit 4 during the operation of the display device 1. That is, the integrated brightness displayed in a certain sub-frame phase of a certain pixel is determined by the integration of the display time aperture ratio, which is the integrated value in the light source lighting period of modulation degree waveform at the pixel array unit 8 response-altered on the basis of the modulation signal from the modulation signal selecting unit 6, and an emission ratio that is the integrated value of the light emission brightness waveforms of the light sources 15 emitting light on the basis of the light source control signals from the light source intensity computing unit 16.

Specifically, in the pixel array unit 8, the display time aperture ratios in the first, second, and third sub-frame phases are, for example, 0.2, 0.9, and 0.6 respectively as illustrated in FIG. 9A.

Moreover, red, green, and blue are illuminated with respective light source emission ratios of 1.0, 0.5, and 0.3 as illustrated in FIG. 9B in the first, second, and third sub-frame phases by the light source intensity computing unit 16 outputting the light source control signals to the light source array unit 9. The light source emission ratios illustrated in FIG. 9B are represented with values normalized to, for example, a maximum of 1 and a minimum of 0. As a result, the integrated brightness ratios of the image display unit 3 in the first, second, and third sub-frame phases are 0.2, 0.45, and 0.18 respectively as illustrated in FIG. 9C.

Based on the above configuration, similar actions and effects of the first embodiment can be achieved with the present embodiment. Specifically, the lighting intensities of the light sources 15 are adjusted on the basis of the input image signal and light source control signals are output. As a result, the light sources 15 perform lighting operations on the basis of the input image signal and the display device 1 can reduce power consumption in the present embodiment.

Third Embodiment

Figure 10:
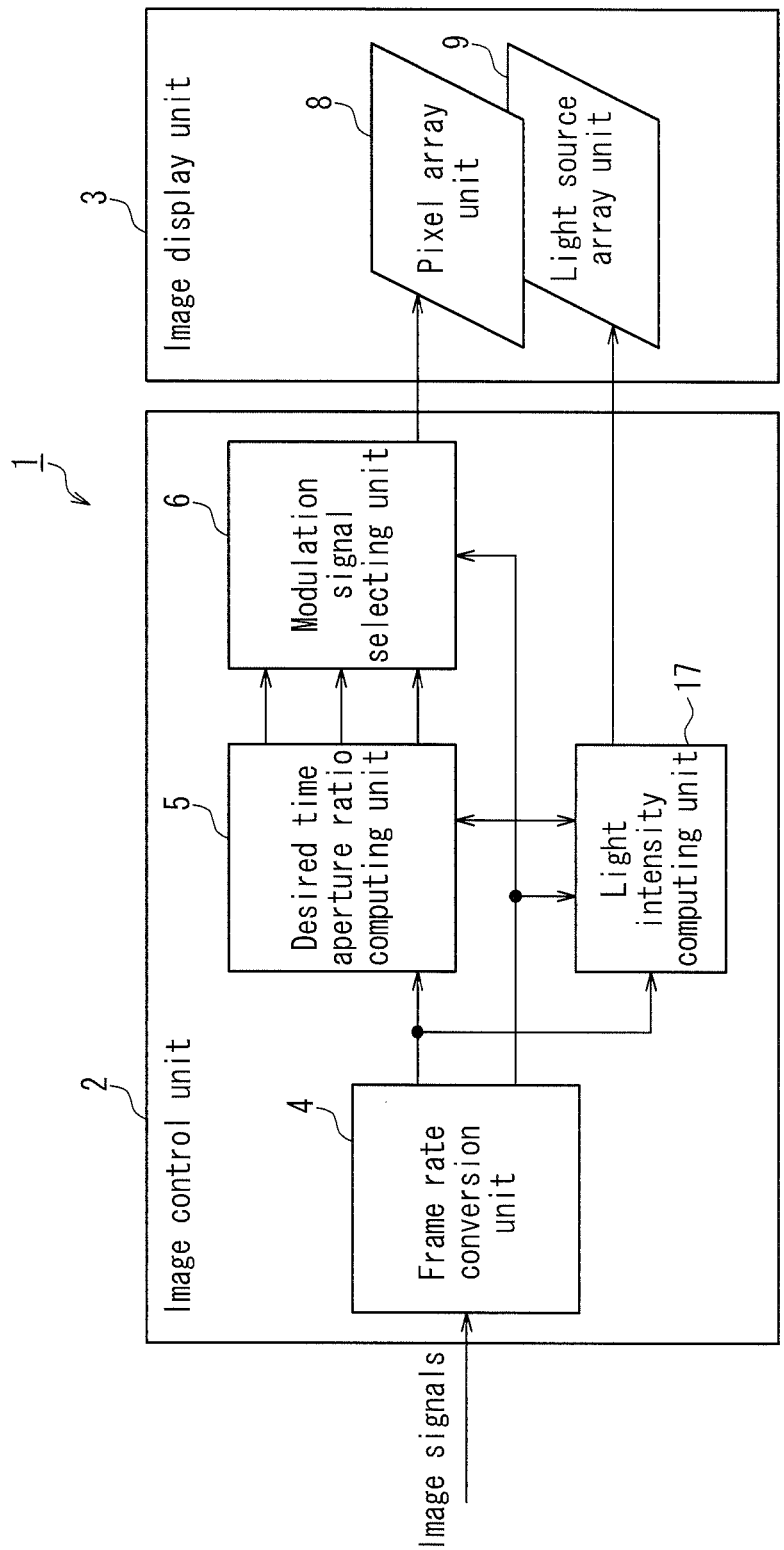
FIG. 10 describes an overall configuration of a display device according to a third embodiment of the present invention.
Figure 11A:
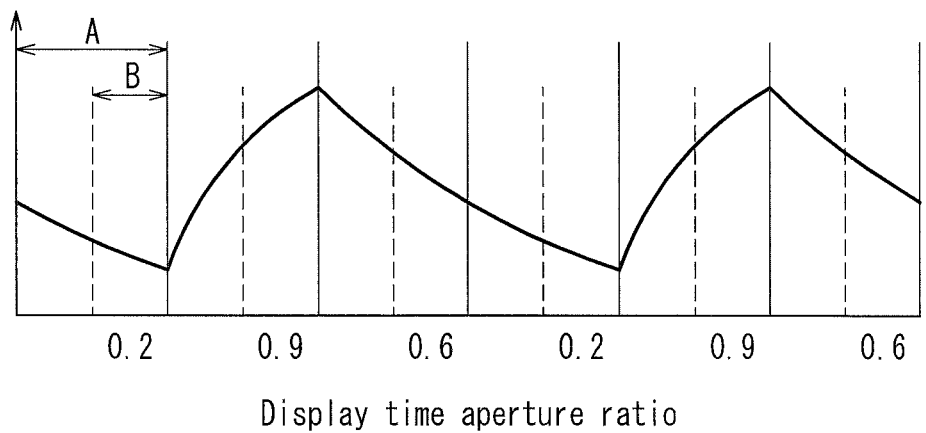
FIGS. 11A, 11B, and 11C are graphs of detailed waveform examples of respective display time aperture ratios, light source emission ratios, and integrated brightness ratios that determine modulation degrees in the display device illustrated in FIG. 10.
Figure 11B:
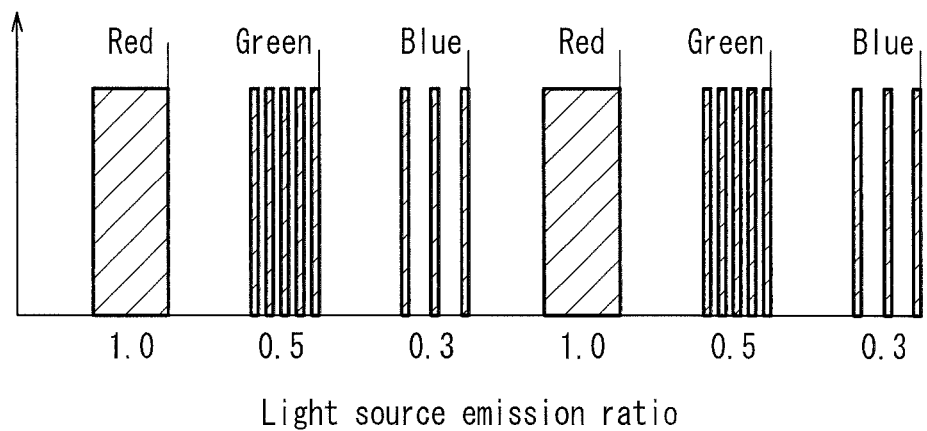
Figure 11C:
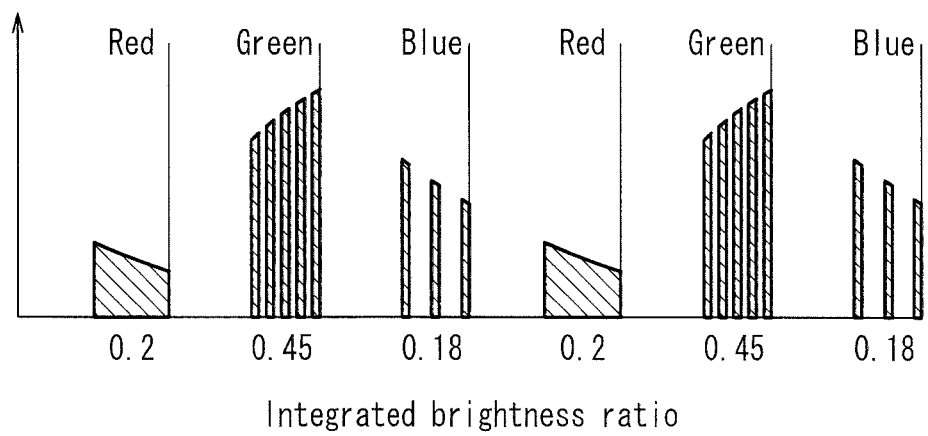

FIG. 10 describes an overall configuration of a display device according to a third embodiment of the present invention. FIGS. 11A, 11B, and 11C are graphs of detailed waveform examples of respective display time aperture ratios, light source emission ratios, and integrated brightness ratios that determine modulation degrees in the display device illustrated in FIG. 10. The main difference between the present embodiment and the second embodiment in the drawings is that the light intensity computing unit outputs a plurality of pulsed signals as light source control signals that cause the light sources to perform a plurality of lighting operations during one sub-frame phase. Elements in common with the above second embodiment are given the same reference numeral and explanations thereof will be omitted.

Similar to the second embodiment, a light source intensity computing unit 17 is provided in the present embodiment as illustrated in FIG. 10. Phase instruction signals and converted image signals are input from the frame rate conversion unit 4 to the light source intensity computing unit 17. The light source intensity computing unit 17 is connected to the desired time aperture ratio computing unit 5. The light source intensity computing unit 17 computes the lighting intensities of the first to third sub-frame phases in order to reproduce the integrated brightness of each color corresponding to the input image signal with the modulation degrees of the pixel array unit 8, and the light source intensity computing unit 17 outputs lighting control signals to the light source array unit 9.

Specifically, the light source intensity computing unit 17 adjusts the lighting intensities of the light sources 15 on the basis of the input image signal to output light source control signals. Furthermore, the light source intensity computing unit 17 outputs a plurality of pulsed signals as light source control signals that cause the light sources 15 to perform a plurality of lighting operations during one sub-frame phase.

Additionally, the desired time aperture ratio computing unit 5, the modulation signal selecting unit 6, and the light source intensity computing unit 17 configure a display signal generator of the present embodiment.

Superpositions of a modulation degree waveform of the light source lighting periods in the pixel array unit 8 and a light emission waveform in the light source array unit 9 are set in the modulation signal selecting unit 6 and the light source intensity computing unit 16 in order to implement the integrated brightness displayed in the image display unit 3 on the basis of an image signal of the display frame rate converted by the frame rate conversion unit 4 during the operation of the display device 1. That is, the integrated brightness displayed in a certain sub-frame phase of a certain pixel is determined by the integration of the display time aperture ratio, which is the integrated value in the light source lighting period of modulation degree waveform at the pixel array unit 8 response-altered on the basis of the modulation signal from the modulation signal selecting unit 6, and an emission ratio that is the integrated value of the light emission brightness waveforms of the light sources 15 emitting light on the basis of the light source control signals from the light source intensity computing unit 17.

Specifically, the display time aperture ratios of the pixel array unit 8 in the first, second, and third sub-frame phases are, for example, 0.2, 0.9, and 0.6 respectively as illustrated in FIG. 11A.

Moreover, red, green, and blue are illuminated with respective light source emission ratios of 1.0, 0.5, and 0.3 as illustrated in FIG. 11B in the first, second, and third sub-frame phases by the light source intensity computing unit 17 outputting light source control signals to the light source array unit 9. Furthermore, as illustrated in the second and third sub-frame phases in FIG. 11B, the light source intensity computing unit 17 outputs a plurality of pulsed signals as light source control signals so that the green and blue light sources 15g, 15b perform a plurality of lighting operations during one sub-frame phase, and the pulses, that is the lighting on/off periods of the above plurality of lighting operations, within the light source emission period of one sub-frame phase each become uniform or approximately uniform, and pulsed emissions having fixed brightness peak heights are performed. As a result, the approximation of the integrated brightness ratios displayed by the integration of the display time aperture ratios and the light source emission ratios of the pixel array unit 8 can be performed in the image display unit 3 without generation large errors due to the shape of the modulation degree waveforms, so that the integrated brightness ratios in the first, second, and third sub-frame phases become 0.2, 0.45, and 0.18 respectively as illustrated in FIG. 11C.

Based on the above configuration, similar actions and effects of the second embodiment can be achieved with the present embodiment. Furthermore, a plurality of pulsed signals that cause the light sources 15 to perform a plurality of lighting operations during one sub-frame phase can be used as light source control signals in the present embodiment. Thereby, in the present embodiment, in the case that it used with a light source, in which emission brightness can be adjusted by modifying a driving current and thereby the emission spectra changes, as a light-emitting diode, the occurrence of color shifting caused by different currents during lighting in the above light source can be suppressed when compared to the use of current regulated emission since light emission is performed with the same constant current during lighting. Another advantage is that the cost of the control circuits can be reduced since there is no need to provide an analog circuit for current control for performing current regulated emission.

Fourth Embodiment

Figure 12:
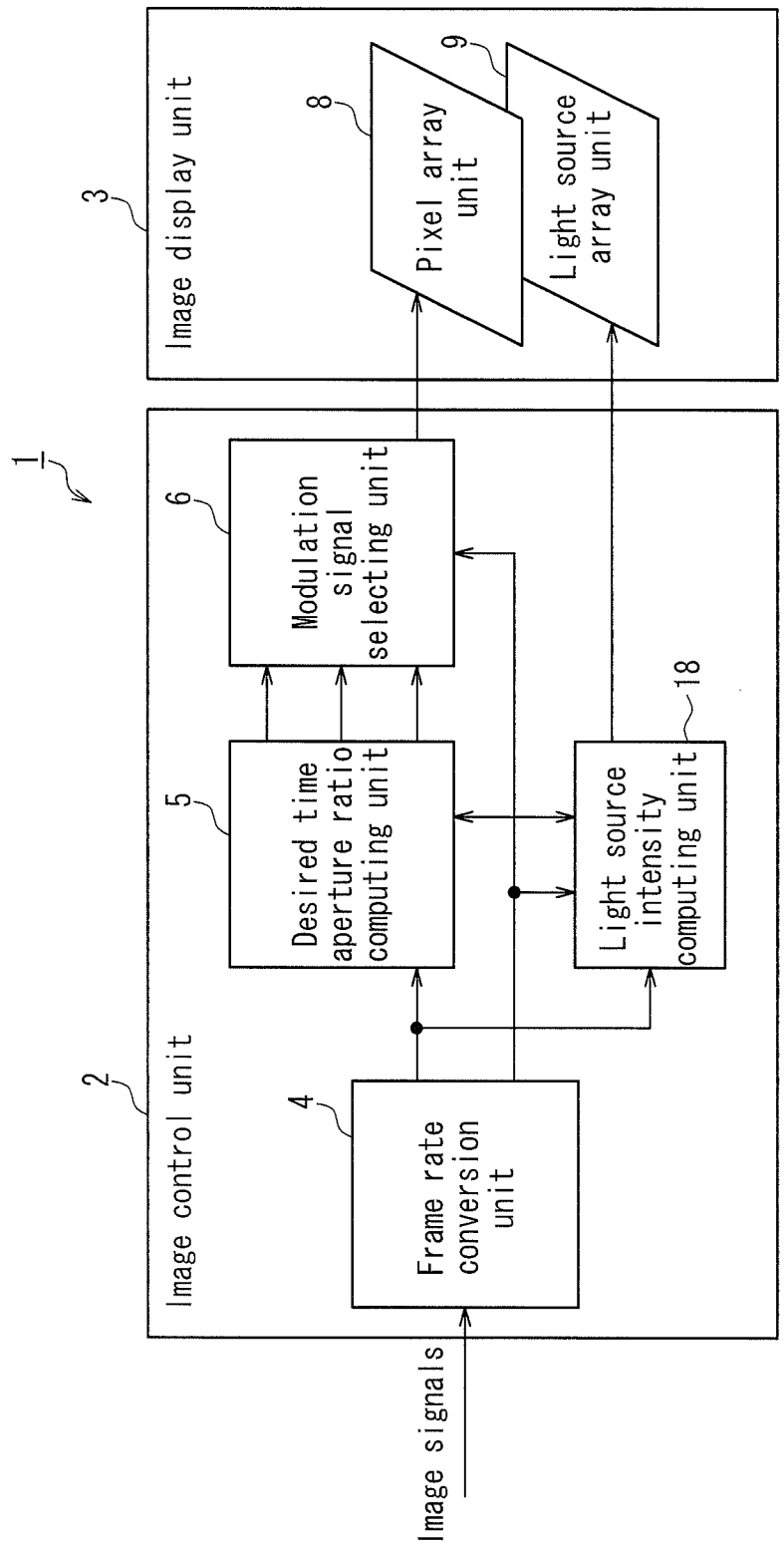
FIG. 12 describes an overall configuration of a display device according to a fourth embodiment of the present invention.

FIG. 12 describes an overall configuration of a display device according to a fourth embodiment of the present invention. FIGS. 13A, 13B, 13C, 13D, 13E, 13F, and 13G are graphs that illustrate detailed waveforms of respective display time aperture ratios, red light source emission ratios, green light source emission ratios, blue light source emission ratios, red integrated brightness ratios, green integrated brightness ratios, and blue integrated brightness ratios that are integrated values in light source lighting periods of modulation degree waveforms in the display device illustrated in FIG. 12. The main difference between the present embodiment and the second embodiment in the drawings is that a light source intensity computing unit causes a plurality of color light sources to emit light in several of the sub-frame phases at the same time. Elements in common with the above second embodiment are given the same reference numeral and explanations thereof will be omitted.

Similar to the second embodiment, a light source intensity computing unit 18 is provided in the present embodiment as illustrated in FIG. 12. Phase instruction signals and image signals after conversion are input from the frame rate conversion unit 4 to the light source intensity computing unit 18. The light source intensity computing unit 18 is connected to the desired time aperture ratio computing unit 5. The light source intensity computing unit 18 computes the lighting intensities of the first to third sub-frame phases in order to reproduce the integrated brightness of each color corresponding to the input image signal with the modulation degrees of the pixel array unit 8, and to output lighting control signals to the light source array unit 9. That is, the light source intensity computing unit 18 adjusts the lighting intensities of the light sources 15 on the basis of the input image signal to output light source control signals. Furthermore, the light source intensity computing unit 18 is configured to output light source control signals that cause the plurality of color light sources 15 to light at the same time.

Additionally, the desired time aperture ratio computing unit 5, the modulation signal selecting unit 6, and the light source intensity computing unit 18 configure a display signal generator of the present embodiment.

Specifically, the display time aperture ratios of the pixel array unit 8 in the first, second, and third sub-frame phases are, for example, 0.2, 0.9, and 0.6 respectively as illustrated in FIG. 13A.

The light source intensity computing unit 18 outputs the light source control signals to the light source array unit 9, so that the red light source 15r is lit in the second and third sub-frame phases with respective light source emission ratios of 0.5 and 0.6 without performing a lighting operation in the first sub-frame phase as illustrated in FIG. 13B. Further, the green light source 15g is lit in the second sub-frame phase with a light source emission ratios of 1.0 without performing lighting operations in the first or third sub-frame phases as illustrated in FIG. 13C. Further, the blue light source 15b is lit in the first, second, and third sub-frame phases with respective light source emission ratios of 1.0, 0.5, and 0.2 as illustrated in FIG. 13D.

As a result, the red integrated brightness ratios of the image display unit 3 in the first, second, and third sub-frame phases are 0, 0.45, and 0.36 respectively as illustrated in FIG. 13E. Further, the green integrated brightness ratios in the first, second, and third sub-frame phases are 0, 0.9, and 0 respectively as illustrated in FIG. 13F, and the blue integrated brightness ratios in the first, second, and third sub-frame phases are 0.2, 0.45, and 0.12 respectively as illustrated in FIG. 13G. Color display of the superposed color components is then performed in each of the sub-frame phases by the image display unit 3.

Based on the above configuration, similar actions and effects of the second embodiment can be achieved with the present embodiment. Furthermore, the plurality of color light sources 15 is caused to light at the same time in several of the sub-frame phases in the present embodiment. As a result, an effect of concentrating display brightness in a specific sub-frame phase can be obtained, so that the occurrence of color breaking can be prevented or suppressed.

Fifth Embodiment

Figure 14:
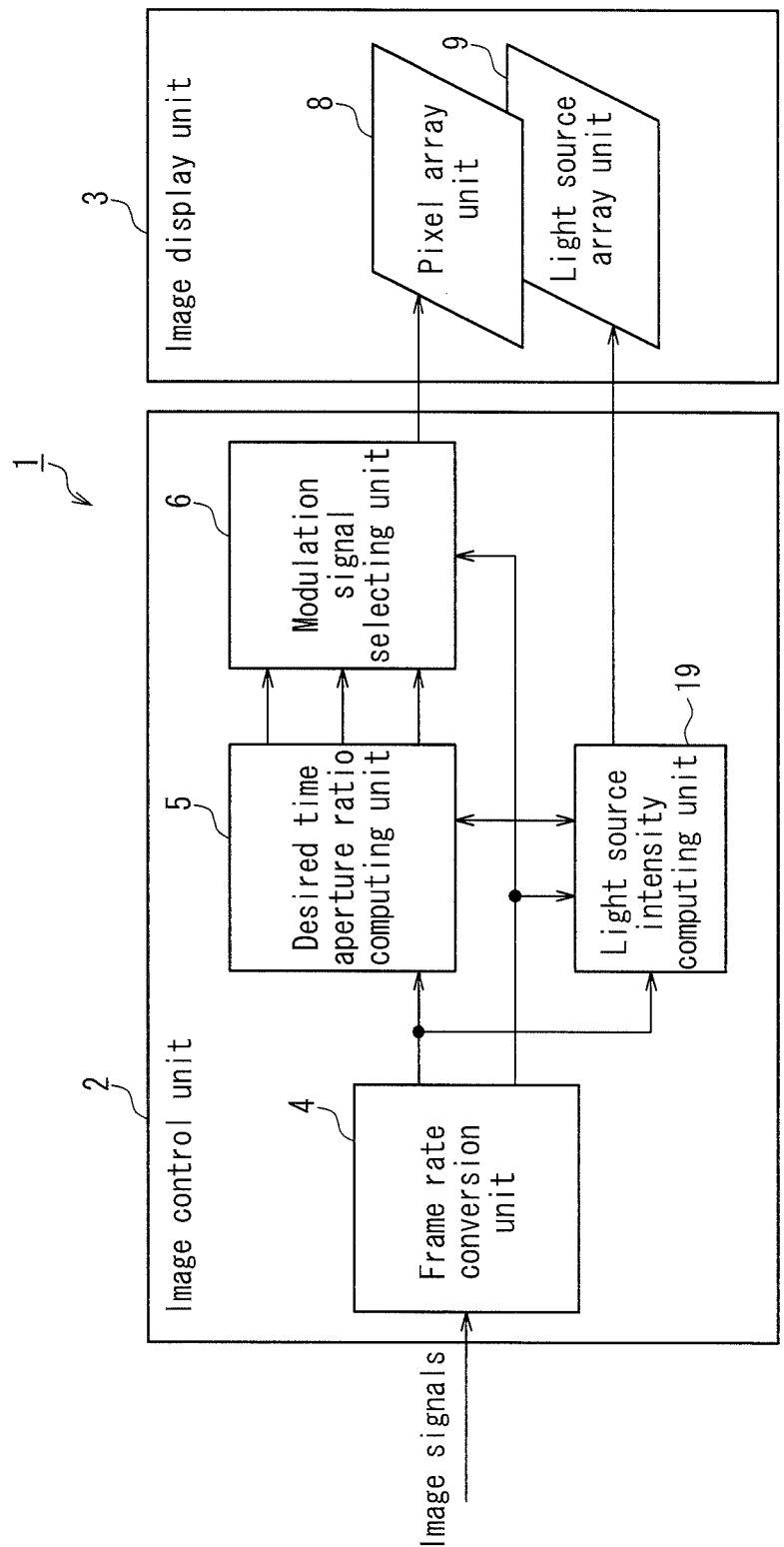
FIG. 14 describes an overall configuration of a display device according to a fifth embodiment of the present invention.

FIG. 14 describes an overall configuration of a display device according to a fifth embodiment of the present invention. FIG. 15 describes a detailed example of a plurality of illumination areas provided in a light source array unit and a plurality of display areas illuminated by light from the illumination areas in the display device illustrated in FIG. 14. The main difference between the present embodiment and the second embodiment in the drawings is that a light source intensity computing unit outputs a light source control signal for independently controlling a lighting intensity to each light source or each set of a plurality of light sources in a light source array unit composed of a plurality of light sources in which amounts of light reaching each pixel from each light source are different. Elements in common with the above second embodiment are given the same reference numeral and explanations thereof will be omitted.

Specifically, a light source intensity computing unit 19 is provided in the present embodiment as illustrated in FIG. 14 in the same way as the second embodiment. Phase instruction signals and image signals after conversion are input from the frame rate conversion unit 4 to the light source intensity computing unit 19. The light source intensity computing unit 19 is connected to the desired time aperture ratio computing unit 5. The light source intensity computing unit 19 computes the lighting intensities of the first to third sub-frame phases in order to reproduce the integrated brightness of each color corresponding to the input image signal with the modulation degrees of the pixel array unit 8, and outputs lighting control signals to the light source array unit 9. That is, the light source intensity computing unit 19 adjusts the lighting intensities of the light sources 15 on the basis of the input image signals to output light source control signals.

Further, the light source intensity computing unit 19 is configured to output light source control signals for independently controlling lighting intensities with respect to each light source 15 or to each set of a plurality of light sources 15, to the light source array unit 9 composed of a plurality of light sources 15 in which amounts of light reaching each pixel P from each light source 15 are different.

That is, a plurality of display areas is set on the display surface of the pixel array unit 8 of the present embodiment. Additionally, a plurality of illumination areas that causes the respective light of the light sources 15 to be incident on the plurality of display areas are set in the light source array unit 9 of the present embodiment. The light source intensity computing unit 19 performs local dimming (area active backlight) driving that causes light driving operations of the light source 15 in each illumination area.

More specifically, as illustrated in FIG. 15, 100 illumination areas 1-1, 1-2, ..., 10-9, 10-10 are set in the light source array unit 9. One light source 15 illustrated in FIG. 3 is assigned to each of the illumination areas 1-1, 1-2, ..., 10-9, 10-10. The illumination areas 1-1, 1-2, ..., 10-9, 10-10 cause light from each of the corresponding light sources 15 to be incident on display areas (1), (2), ..., (99), (100) provided on the display surface of the pixel array unit 8. A plurality of pixels P are included in each of the display areas (1), (2), ..., (99), (100).

Specifically, when for example 1920×1080 pixels P are provided in the horizontal×vertical directions in the pixel array unit 8, 192×108 pixels P are included in each display area (1), (2), ..., (99), (100). The illumination areas 1-1, 1-2, ..., 10-9, 10-10 and the display areas (1), (2), ..., (99), (100) are set with a one-to-one relationship in the display device 1, and local dimming is configured in which one display area is appropriately irradiated with illumination light from one illumination area on the basis of information to be displayed.

With the abovementioned local dimming, each of RGB color light from the light sources 15r, 15g, 15b included in the corresponding light sources 15 in the respective illumination areas 1-1, 1-2, ..., 10-9, 10-10 is able to radiate mutually independently toward the pixel array unit 8 side. Thereby, each of the RGB color light can be appropriately incident onto the respective display areas (1), (2), ..., (99), (100) from the illumination areas 1-1, 1-2, ..., 10-9, 10-10 on the basis of the information to be displayed, so that reproducibility each of the RGB colors can be easily improved.

Instead of the above description, a set composed of a plurality of light sources 15 may be assigned to one illumination area.

Based on the above configuration, similar actions and effects of the second embodiment can be achieved with the present embodiment. Moreover, since light driving of each light source 15 or each set of the plurality of light sources 15 is performed, the power consumption of the display device 1 can be easily reduced in the present embodiment.

The above configurations are all examples and are not intended to limit the embodiments. The technical scope of the present invention is regulated by the scope of the claims and any modifications to the elements described therein or their equivalents are included within the technical scope of the present invention.

For example, although the present invention has been described as applying to a transmissive liquid crystal display device, the display signal generator and the image display method of the present invention are not limited as such and may be applicable to various types of non-radiative display devices that use light from a light source to display information. Specifically, the display device of the present invention may be preferably used in a semi-transmissive liquid crystal display device, or a projection-type display device such as a rear-projection device that uses the above liquid crystal panel in a light bulb, or furthermore, in a pixel array that can modulate (can control transmittance and reflectance ratio) light in each pixel such as electronic ink or electro-wetting (EW) and in the case of performing image display using a light source of two or more colors in which various color emissions are possible.

While above description includes the description of a one frame being divided into first to third sub-frame phases, the present invention is not limited as such, nor is the present invention limited to a display device in which display colors of input images can be reproduced in each pixel by the superposition of one frame into N number (where N is an integer of 2 or more) of sub-frame phases in the time direction.

Although an example in which a 3-in-1 type of light-emitting diode of integrated RGB light-emitting diodes is used as a light source is described in the above explanation, the present invention is not limited to this type of light source and, for example, a discharge tube such as a cold-cathode fluorescent tube or a hot-cathode fluorescent tube, a light-emitting element such as an organic or inorganic electronic luminescence (EL) element, or a light-emitting device such as a plasma display panel (PDP) may be used in the light source.

As described in the above embodiments however, the use of a light-emitting diode in the light source is preferable since a display device may be easily provided with low power consumption and excellent environmental consideration.

In addition to the above description, the first to fifth embodiments may be combined as appropriate.

INDUSTRIAL APPLICABILITY

The present invention is useful for a display signal generator that can improve image quality, a display device that uses the display signal generator, and a method of image display.

LIST OF REFERENCE NUMERALS

1 Display device,
5 Desired time aperture ratio computing unit (display signal generator),
6 Modulation signal selecting unit (display signal generator),
7 Light source driving unit (display signal generator),
8 Pixel array unit,
9 Light source array unit,
15 Light source
15r Red light source
15g Green light source
15b Blue light source
16, 17, 18, 19 Light source intensity computing unit (display signal generator)
P Pixel

The invention claimed is:

1. A display signal generator for a display device including a pixel array unit of a plurality of aligned pixels and a plurality of light sources of different color components, configured to be able to adjust display brightness by modulating light from the light sources, and to reproduces a display color of an input image in each pixel by superposition of N number (where N is an integer of three or more) of sub-frame phases in the time direction, wherein in order to display an input image corresponding to an input image signal, a combination of desired time aperture ratios is obtained for each pixel in the N number of sub-frame phases, a combination of display time aperture ratios in the N number of sub-frame phases at the time the display color is actually reproduced is set from the combination of desired time aperture ratios on the basis of response characteristics of the pixel array unit, and a modulation signal for implementing the set combination of display time aperture ratios is output to the display unit, and wherein when desired time aperture ratios in three continuous sub-frame phases among the three or more sub-frame phases are respectively represented as A1, A2, and A3 and modulation signals in the three continuous sub-frame phases are respectively represented as S1, S2, and S3, and the following inequality (1) is satisfied with respect to thresholds T1, T2 prescribed by the response characteristics of the pixel array unit:

$$A1 \geq T2 > T1 \geq A2 \geq A3 \tag{1}$$

the modulation signals satisfy the following inequality (2):

$$S2 < S3 \tag{2}.$$

2. The display signal generator according to claim 1, wherein a modulation signal for implementing the combination of display time aperture ratios is output to cause hue of a display color displayed by the superposition of the N number of sub-frame phases in the time direction to approximate hue of the input image corresponding to the input image signal.

3. The display signal generator according to claim 1, wherein a modulation signal for implementing the combination of display time aperture ratios is output to cause a difference between the smallest primary color component and the second smallest primary color component when a display color displayed by the superposition of the N number of sub-frame phases in the time direction is represented with the three primary colors of red, green, and blue, to approximate a difference between the smallest primary color component and the second smallest primary color component when the input image corresponding to the input image signal is represented with the three primary colors of red, green, and blue.

4. The display signal generator according to claim 1, wherein a modulation signal for implementing the combination of display time aperture ratios is output to cause a difference between the largest primary color component and the second largest primary color component when a display color displayed by the superposition of N number of sub-frame phases in the time direction is represented with the three primary colors of red, green, and blue, to approximate a difference between the largest primary color component and the second largest primary color component when the input image corresponding to the input image signal is represented with the three primary colors of red, green, and blue.

5. The display signal generator according to claim 1, wherein when there is one sub-frame phase of a desired time aperture ratio that is larger than an average of the desired time aperture ratios in the three or more sub-frame phases, a modulation signal is output to cause a difference of the display time aperture ratios between the respective sub-frame phases from the second largest desired time aperture ratio sub-frame phase to the smallest desired time aperture ratio sub-frame phase to approximate a difference of desired time aperture ratios between the corresponding sub-frame phases from the second largest desired time aperture ratio sub-frame phase to the smallest desired time aperture ratio sub-frame phase.

6. The display signal generator according to claim 1, wherein when there is one sub-frame phase of a desired time aperture ratio that is larger than an average of the desired time aperture ratios in the three or more sub-frame phases, a modulation signal is output to cause a difference of display time aperture ratios between the largest desired time aperture ratio sub-frame phase and the second largest desired time aperture ratio sub-frame phase to approximate a difference of desired time aperture ratios between the largest desired time aperture ratio sub-frame phase and the second largest desired time aperture ratio sub-frame phase.

7. The display signal generator according to claim 1, wherein when there is one sub-frame phase of a desired time aperture ratio that is smaller than an average of desired time aperture ratios in the three or more sub-frame phases, a modulation signal is output to cause a difference of display time aperture ratios between the respective sub-frame phases from the second smallest desired time aperture ratio sub-frame phase to the largest desired time aperture ratio sub-frame phase to approximate a difference of desired time aperture ratios between the corresponding sub-frame phases from the second smallest desired time aperture ratio sub-frame phase to the largest desired time aperture ratio sub-frame phase.

8. The display signal generator according to claim 1, wherein when there is one sub-frame phase of a desired time aperture ratio that is smaller than an average of desired time aperture ratios in the three or more sub-frame phases, a modulation signal is output to cause a difference of the display time aperture ratios between the smallest desired time aperture ratio sub-frame phase and the second smallest desired time aperture ratio sub-frame phase to approximate a difference of desired time aperture ratios between the smallest desired time aperture ratio sub-frame phase and the second smallest desired time aperture ratio sub-frame phase.

9. The display signal generator according to claim 1, wherein when desired time aperture ratios in three continuous sub-frame phases among the three or more sub-frame phases are respectively represented as A4, A5, and A6, and modulation signals in the three continuous sub-frame phases are respectively represented as S4, S5, and S6, and the following inequality (3) is satisfied with respect to thresholds T3, T4 prescribed by the response characteristics of the pixel array unit:

$$A4 \leq T3 < T4 \leq A5 \leq A6 \tag{3}$$

the modulation signals satisfy the following inequality (4):

$$S5 > S6 \tag{4}.$$

10. A display device that uses a display signal generator according to claim 1.

11. A method of image display for a display device including a pixel array unit of a plurality of aligned pixels and a plurality of light sources of different color components, configured to be able to adjust display brightness by modulating light from the light sources, and to reproduces a display color of an input image in each pixel by superposition of N number (where N is an integer of three or more) of sub-frame phases in the time direction, the method comprising:

obtaining a combination of desired time aperture ratios for each pixel in the N number of sub-frame phases in order in order to display an input image corresponding to an input image signal;

setting a combination of display time aperture ratios in the N number of sub-frame phases when actually reproducing the display color, from the desired time aperture ratios on the basis of response characteristics of the pixel array unit; and outputting a modulation signal for implementing the set combination of display time aperture ratios; wherein when the desired time aperture ratios in three continuous sub-frame phases among the three or more sub-frame phases are respectively represented as A1, A2, and A3, and modulation signals in the three continuous sub-frame phases are respectively represented as S1, S2, and S3, and the following inequality (1) is satisfied with respect to thresholds T1, T2 prescribed by the response characteristics of the pixel array unit:

$$A1 \geq T2 > T1 \geq A2 \geq A3 \tag{1}$$

the modulation signals satisfy the following inequality (2):

$$S2 < S3 \tag{2}$$

12. The method of image display according to claim 11, comprising:

outputting a modulation signal for implementing the combination of the display time aperture ratios to cause hue of a display color displayed by the superposition of the N number of sub-frame phases in the time direction to approximate hue of the input image corresponding to the input image signal.

13. The method of image display according to claim 11, comprising:

outputting a modulation signal for implementing the combination of the display time aperture ratios to cause a difference between the smallest primary color component and the second smallest primary color component when a display color displayed by the superposition of the N number of sub-frame phases in the time direction is represented with the three primary colors of red, green, and blue, to approximate a difference between the smallest primary color component and the second smallest primary color component when the input image corresponding to the input image signal is represented with the three primary colors of red, green, and blue.

14. The method of image display according to claim 11, comprising:

outputting a modulation signal for implementing the combination of the display time aperture ratios to cause a difference between the largest primary color component and the second largest primary color component when a display color displayed by the superposition of the N number of sub-frame phases in the time direction is represented with the three primary colors of red, green, and blue, to approximate a difference between the largest primary color component and the second largest primary color component when the input image corresponding to the input image signal is represented with the three primary colors of red, green, and blue.

15. The method of mage display according to claim 11, wherein:

when there is one sub-frame phase of a desired time aperture ratio that is larger than an average of the desired time aperture ratios in the three or more sub-frame phases, outputting a modulation signal to cause a difference of the display time aperture ratios between the respective sub-frame phases from the second largest desired time aperture ratio sub-frame phase to the smallest desired time aperture ratio sub-frame phase to approximate a difference of desired time aperture ratios between the corresponding sub-frame phases from the second largest desired time aperture ratio sub-frame phase to the smallest desired time aperture ratio sub-frame phase.

16. The method of image display according to claim 11, wherein when a sub-frame phase of a desired time aperture ratio that is larger than an average of the desired time aperture ratios in the three or more sub-frame phases is one, outputting a modulation signal to cause a difference of the display time aperture ratios between the largest desired time aperture ratio sub-frame phase and the second largest desired time aperture ratio sub-frame phase to approximate a difference of a desired time aperture ratios between the largest desired time aperture ratio sub-frame phase and the second largest desired time aperture ratio sub-frame phase.

17. The method of image display according to claim 11, wherein comprising:

when there is one sub-frame phase of a desired time aperture ratio that is smaller than an average of the desired time aperture ratios in the three or more sub-frame phases, outputting a modulation signal to cause a difference of the display time aperture ratios between the respective sub-frame phases from the second smallest desired time aperture ratio sub-frame phase to the largest desired time aperture ratio sub-frame phase to approximate a difference of desired time aperture ratios between the corresponding sub-frame phases from the second smallest desired time aperture ratio sub-frame phase to the largest desired time aperture ratio sub-frame phase.

18. The method of image display according to claim 11, wherein when there is one sub-frame phase of a desired time aperture ratio that is smaller than an average of the desired time aperture ratios in the three or more sub-frame phases, outputting a modulation signal to cause a difference of the display time aperture ratios between the smallest desired time aperture ratio sub-frame phase and the second smallest desired time aperture ratio sub-frame phase to approximate a difference of a desired time aperture ratios between the smallest desired time aperture ratio sub-frame phase and the second smallest desired time aperture ratio sub-frame phase.

19. The method of image display according to claim 11, wherein when the desired time aperture ratios in three continuous sub-frame phases among the three or more sub-frame phases are respectively represented as A4, A5, and A6, and modulation signals in the three continuous sub-frame phases are respectively represented as S4, S5, and S6, and the following inequality (3) is satisfied with respect to thresholds T3, T4 prescribed by the response characteristics of the pixel array unit:

$$A4 \leq T3 < T4 \leq A5 \leq A6 \tag{3}$$

the modulation signals satisfy the following inequality (4):

$$S5 > S6 \tag{4}$$

* * * * *